US009594778B1

United States Patent
Goodwin et al.

(10) Patent No.: US 9,594,778 B1
(45) Date of Patent: *Mar. 14, 2017

(54) DYNAMIC CONTENT SYSTEMS AND METHODS

(71) Applicant: LockPath, Inc., Overland Park, KS (US)

(72) Inventors: Christopher M. Goodwin, Olathe, KS (US); Timothy R. Norman, Overland Park, KS (US)

(73) Assignee: LockPath, Inc., Overland Park, KS (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/470,821

(22) Filed: Aug. 27, 2014

Related U.S. Application Data

(63) Continuation of application No. 13/646,005, filed on Oct. 5, 2012, now Pat. No. 8,874,621.

(60) Provisional application No. 61/545,195, filed on Oct. 9, 2011, provisional application No. 61/545,543, filed on Oct. 10, 2011.

(51) Int. Cl.
*G06F 17/30* (2006.01)

(52) U.S. Cl.
CPC .............................. *G06F 17/30292* (2013.01)

(58) Field of Classification Search
CPC ........... G06F 17/3012; G06F 17/30893; G06F 17/30569; G06F 17/30595; G06F 8/60; G06F 11/3072; G06F 17/301; G06F 17/30286; G06F 17/30292; G06F 17/30557; G06F 17/30607; G06F 17/30923; G06F 17/30997
See application file for complete search history.

(56) References Cited

U.S. PATENT DOCUMENTS

| | | | | |
|---|---|---|---|---|
| 6,609,133 | B2 * | 8/2003 | Ng | G06F 8/30 |
| 7,725,498 | B2 * | 5/2010 | Barsness | G06F 17/30315 |
| | | | | 707/803 |
| 7,840,605 | B2 * | 11/2010 | Ruan | G06F 8/24 |
| | | | | 707/756 |
| 7,945,604 | B2 * | 5/2011 | Wang | G06F 17/30595 |
| | | | | 707/803 |
| 8,352,512 | B2 * | 1/2013 | Tomic | G06F 17/30917 |
| | | | | 707/803 |
| 8,429,598 | B2 * | 4/2013 | Seitz | G06F 9/5016 |
| | | | | 717/108 |
| 8,874,621 | B1 * | 10/2014 | Goodwin | G06F 17/30569 |
| | | | | 707/756 |
| 2002/0169777 | A1 * | 11/2002 | Balajel | G06F 17/30575 |
| 2003/0225772 | A1 * | 12/2003 | Sykes | G06Q 30/06 |
| 2009/0055432 | A1 * | 2/2009 | Smith | G06F 17/30595 |

\* cited by examiner

*Primary Examiner* — Debbie Le
(74) *Attorney, Agent, or Firm* — Perkins Coie LLP

(57) ABSTRACT

A dynamic content system integrates dynamic and static content through entry of physical table and field structures and creating metadata describing the physical structures. A formula engine with a cascading formula detection engine calculates fields, and a dynamic meta-assembly engine dynamically generates code for the dynamic content. A dynamic meta-reporting engine with a dynamic meta-query engine reports content. An access control engine and workflow engine integrate into the dynamic content system to provide content permissions and routing.

49 Claims, 28 Drawing Sheets

DYNAMIC CONTENT SYSTEMS AND METHODS

RELATED APPLICATIONS

This application is a continuation of U.S. patent application Ser. No. 13/646,005, filed Oct. 5, 2012, which claims priority to U.S. Patent App. Ser. No. 61/545,195, filed Oct. 9, 2011, entitled Dynamic Content Systems and Methods, and U.S. Patent App. Ser. No. 61/545,543, filed Oct. 10, 2011, entitled Dynamic Content Systems and Methods, the entire contents of which are incorporated by reference herein in their entirety.

FEDERALLY SPONSORED RESEARCH OR DEVELOPMENT

Not Applicable.

COMPACT DISK APPENDIX

Not Applicable.

BACKGROUND

Object-relational mapping (ORM) is a technique for converting data between different data type systems in object-oriented programming systems. The mapping effectively creates a virtual object database that can be used from within the object-oriented programming system.

In some systems, an object model expressed in an object oriented programming language is mapped to a data model of a relational database (schema or database model). Operations on the data are then conducted according to the object model. In this instance, database commands are not issued to the database. Instead, object methods are executed within the object model and values are changed within the object model. When a query is made for the relational database or changes to the data are made, those queries and changes are translated to database commands, and those commands are sent to the database.

A type (object) is the root of the object model. A type class (object) represents type declarations: class types, interface types, array types, value types, enumeration types, type parameters, generic type definitions, and open or closed constructed generic types. The members of the type class are used to get information about a type declaration, such as constructors, methods, fields, properties, and events of a class, in addition to the module and assembly in which the class is deployed.

An object model may have an entity class, class member, association, and method that map to a database model having a table, field, foreign key relationship, and stored procedure or function, respectively. In this example, a database table is represented by an entity class. A foreign key relationship defines a relationship between two database tables with a primary-key identified in a first table (or a field in the first table) and a foreign-key identified in another table (or a field or multiple fields in another table).

Entity objects (or just entities) have properties (attributes), methods (functions), and data. A property may have an accessor that contains executable statements associated with getting (reading or computing) or setting (writing) the property. Thus, an accessor is used to obtain data from the database.

Entity objects may have expressions or expression trees that represent a node in a tree-like data structure. Each node is an expression (i.e., a method call or an operation). Code represented by expression trees can be compiled, which enables dynamic modification of executable code, the execution of queries and databases, and the creation of queries.

A lambda expression is one of any number of expressions (and expression types) that is used to build an expression tree. A lambda expression is a means of defining an abstract algorithm before it is known to what data that algorithm will be applied.

An assembly is a collection of entity types and resources that are built to work together and form a logical unit of functionality. An assembly contains the information needed at run time so that the application is aware of type implementations.

The type class is the root of the reflection functionality and is the primary way to access metadata. Reflection provides objects that encapsulate assemblies, modules, and types. Reflection can be used to dynamically create an instance of a type (object), bind the type (object) to an existing object, or get the type from an existing object. The type's methods may be invoked or the fields and properties of the type may be accessed.

Some ORM systems contain classes that are used to generate an ORM object model that represents the structure and content of a relational database. These mappings are identified as namespaces. For example, a mapping namespace class (object) may designate a property to represent a database association (such as a foreign-key relationship), a field attribute (to associate a class with a field (column) and a database table), an accessor to a member, a meta-association to represent an association relationship between two entity types, a mapping between a context method and a database function, a meta-data table to represent an abstraction of a database table view, a meta-data type to represent a mapping of a domain object type to a field (column) of a database table, and other mappings.

One type of namespace is a reflection namespace. The reflection namespace contains the types that retrieve information about assemblies, modules, members, parameters, and other entities by examining their metadata. These types can also be used to manipulate instances of loaded types. For example, a namespace object represents an abstract root object for a data source. Properties can be referenced by namespaces.

A run time loader manages application domains. This management includes loading each assembly into the appropriate application domain and controlling the memory layout of the type hierarchy within each assembly. Assemblies contain modules, modules contain types, and types contain members.

Rows in a relational database table do not have unique identities. Since each row has a unique primary key, no two rows share the same key value. However, this fact constrains only the contents of the database table.

When a new row is retrieved from a database, the row is logged in an identity table by its primary key, and a new object is created. When that same row is retrieved, the original object instance is handed back to the application. Thus, the data context manages the object identity and translates the concept of identity as seen by the database (e.g., primary key) into the concept of identity accepted by the ORM (e.g., instances). The ORM application only sees the object in the state from which it was first retrieved. An identity table acts as a cache of all previously retrieved objects.

A data context provides the mapping of all object entities to the database model. It is through the data context that the application containing the object entities can query the database. It is through the data context that changes to the database can be implemented.

Data management tasks in object-oriented programming systems typically are implemented by manipulating objects that are almost always non-scalar variables. Scalar variables hold only a single value at a time, whereas non-scalar variables may hold composite variables, such as arrays, lists, hash, records, and other non-scalar variable types.

Many database systems, such as structured query language database management systems and other relational database management systems, can only store or manipulate scalar values, such as integers and strings organized within tables. Thus, ORM systems convert object values from object data structures into groups of simpler values for storage in a database and convert the database values back to object values upon retrieval. The process of retrieving data from a database and mapping the data to an ORM object is sometimes referred to as touching the object.

There are, however, problems translating the logical representation of ORM objects into a separate form capable of being stored in a relational database while also preserving properties of the ORM objects and their relationships to each other so that the ORM objects can be reloaded (e.g., so that their data can be accessed) as the object is needed. Other problems occur when mapping between ORM objects and relational databases, particularly when ORM objects are mapped in a straight-forward way to database tables or relational schemas.

Some mapping problems are referred to as object-relational competence mismatches. Mismatches include encapsulation (where object methods are hidden and cannot be accessed until provided, particularly for accessing relational database records), invariance (where invariants are not easily represented in relational databases), accessibility (where relational databases and objects and object models may have conflicts over relativity versus absolute classifications and characteristics of objects and records), mapping to relational concepts (where proper mappings between relational concepts and object-oriented concepts can be made if relational database tables are linked to associations found in objects), data type differences (scalar versus non-scalar and pointer prohibition versus pointer use), structural differences (entity objects verses relational database records), manipulative differences (the ability to manipulate the data models; whereas relational databases use primitive operators to query and manipulate data, objects query and manipulate objects through physical access at specific imperative operations), and transactional differences (the granularity of transactions in relational databases versus objects).

SUMMARY

A dynamic content system accommodates runtime-defined content and a collective of features, including access control permissions, workflow, and formulas, that are interrelated to the dynamic content.

In one aspect, a dynamic content system comprises a processor and a plurality of engines to execute on the processor. The engines comprises a dynamic content framework engine to receive one or more parameters of a physical table structure of a dynamic relational database table and one or more physical field structures of the physical table structure, the physical structures defining dynamic content, and create metadata describing the physical structures of the dynamic table. The engines also include a dynamic meta-assembly engine to, at run-time, create a database markup language file representation of the dynamic relational database table, modify the database markup language file representation based on the metadata describing the physical structures of the dynamic table, create object model source code classes from the modified database markup language file representation, and compile the classes.

In another aspect, a dynamic content method receiving one or more parameters of a physical table structure of a dynamic relational database table and one or more physical field structures of the physical table structure, the physical structures defining dynamic content, and creating metadata describing the physical structures of the dynamic table. At run-time, a database markup language file representation of the dynamic relational database table is created, the database markup language file representation is modified based on the metadata describing the physical structures of the dynamic table, object model source code classes are created from the modified database markup language file representation, and the classes are compiled.

BRIEF DESCRIPTION OF THE DRAWINGS

FIG. 20 is a screen shot of managing a work flow.

FIG. 21 is a screen shot of managing a work flow stage.

DETAILED DESCRIPTION

Figure 1:
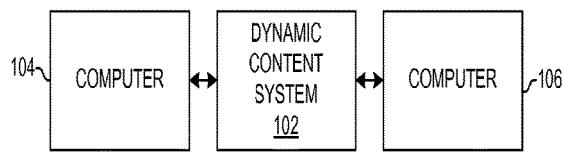
FIG. 1 is a block diagram of a dynamic content system.

The use of prior ORM solutions (such as language integrated query (LINQ)) have some limitations. The employment of a data model-altering system to facilitate dynamic, user-defined content typically comes at the cost of precluding (or discouraging) the use of ORM solutions, which are largely designed to ease data access and manipulation of static data sources as the derived objects are generated via database introspection at development time and compiled into the shipped solution. Thus, user initiated data model changes can not be incorporate into compiled and delivered code.

ORM systems are designed to facilitate static data models and do not provide access to either dynamic content or static content as it relates to or from any dynamic content. Whereas mapped objects facilitate development of hard-coded solutions, they prove to be rigid when attempting to use them for runtime-defined filtration, such as with ad-hoc reporting.

An accepted approach to the above limitations is to bypass the ORM system framework altogether by assembling and executing SQL statements at runtime. This approach is directed to simple systems with flat data models but has several disadvantages, including it is difficult to debug, it exposes the data layer to escapement issues and SQL injection vulnerabilities, arbitrarily deep nesting of relational filtering, grouping, and aggregation, which introduces significant SQL construction complexity in order to ensure that multiple references to tables are uniquely aliased across all contexts, resulting SQL syntax is typically database-specific, and the source-specific query optimizations that are often inherent in ORM systems thus are completely bypassed.

Dynamic LINQ (DLINQ), an extension to LINQ, allows for the dynamic construction of LINQ queries at runtime. A runtime query is constructed as an SQL statement, which is then converted by DUNK into a LINQ expression hierarchy for delayed invocation ultimately being re-emitted at the database-level as SQL again. This approach inherits the escapement, complexity, and security issues that creators of a data tier go to great lengths to avoid. Further, it is only applicable for generating dynamic querying against static content. It does not generate querying against dynamic content. Any model that it queries against must be committed to when the software ships; it provides no means of accommodating dynamic model changes and/or runtime attachment to new LINQ models.

A dynamic content system (DCS) accommodates run-time-defined ("dynamic") content and a collective of features, including access control permissions, workflow, and formulas, that are interrelated to the dynamic content to result in the benefits described herein.

The DCS integrates dynamic and static content for the ORM with a unified meta system (UMS) record class, a formula engine with a cascading formula detection engine to calculate fields, a dynamic meta-assembly engine to consume a dynamic meta-assembly bundle, and a dynamic meta-query reporting engine with a dynamic meta-query engine to get and report content. The access controls and workflow engine integrate with these components to provide advances for the dynamic content. The UMS record/UMS record class represents a base or arbitrary record of a type and enables the DCS to access its fields arbitrarily at runtime.

A dynamic content system (DCS) 102 receives data and other communications from one or more computers 104 and 106 and/or transmits data and other communications to the one or more computers. The DCS 102 and the computers 104 and 106 each have one or more processors and memory, including non-transitory computer readable storage media, other non-volatile memory to store data and programming, volatile memory, and one or more communications interfaces and/or systems to receive and transmit data and other communications. In addition, the DCS 102 also retrieves data from and stores data to a database, such as a relational database.

The DCS 102 is, in one example, an ORM system. The DCS 102 creates an ORM object model that represents the structure and content of a relational database ("relational database data model"). The DCS 102 enables creation and modification of a physical model of the ORM object for dynamic and static content. For example, the DCS 102 contains ORM classes that are used to generate an ORM object model that represents the relational database data model. The ORM object model is mapped to the relational database data model.

The DCS 102 provides a platform to accept large amounts of data, store the data, and manipulate the data, but do so while providing flexibility in the design and modification of a database for that data. The DCS 102 morphs the database schema at run time to dynamically access the content of the DCS 102.

The DCS 102 enables users to define dynamic assets, including one or more dynamic tables having one or more dynamic fields (alternately referred to as columns), and static assets, including one or more static tables having static fields (alternately referred to as columns). For example, the one or more dynamic tables and one or more static tables may be relational database tables. Dynamic components are run-time defined components.

Dynamic tables can be physically modified, meaning fields of the table can be added, deleted, or otherwise modified. Conversely, static tables cannot be modified. Once a static table is defined, its physical structure can not be modified to remove fields, add fields, or modify fields. Thus, the dynamic tables in the DCS 102 have custom fields that also are dynamic, meaning attributes of the fields can be defined and accessed at run time.

In one example a dynamic table has a table definition. A table definition identifies attributes (alternately referred to as attributes) for a table, including a table name and the fields in the table, for example, a table display name, a name processable by a relational database system, a description, a location in which the field is defined for a dynamic entry form (i.e., a tab), one or more permission parameters, finger print fields (including created by (who created the table), created when (when the table was created), updated by (who updated the table), and update when (when the table was updated)), a table identifier (ID), and other fields.

In another example, a dynamic field has a field definition. A field definition identifies attributes for a field, including a field name, field type, permission parameters for a field, and other attributes for the field.

Data records that have properties populate the table and have the defined fields. For example, dynamic tables and static tables are relational database tables, and the data records are stored in a relational database in memory of the DCS.

The data schema for the relational database tables are defined by the tables and fields. For example, a field type may be text, numeric, date, internet protocol (IP address), lookup documents, assessment, or other. A look-up field type points to another table or one or more fields of another table. Each field type has options, such as a character length, a precision number identifying the number of digits after a decimal point, a one-to-one relationship for a look-up or pointer to another table (primary key-foreign key identity), a look-up field having a one-to-many or many-to-many relationship (a look-up field pointing to multiple fields in another table or multiple tables), an assessment field that binds surveys to a record, and permission fields defining who has access to the field or the table and the type of access that is allowed.

A table has fields and relationships. A table is a repository for one or more types of records it represents. A record refers to an entry (e.g. row) in a table. Tables are stored in memory or a database in the DCS 102 and are accessed by the DCS' processor.

The DCS 102 links tables or fields in tables at run time so that the DCS 102 can pull data from a field from a table and store it in another field of another table (or multiple fields in another table) in a primary key-foreign key relationship.

The DCS 102 creates metadata identifying the dynamic tables and the dynamic fields. For example, metadata is data about data, content, or structures or containers for data or content. The table metadata identifies (i.e. includes data identifying) attributes or properties of the dynamic table. Examples of table metadata are a table identifier, an identifier indicating who created the dynamic table, an identifier indicating when the dynamic table was created, an identifier indicating who updated the table, and an identifier indicating when the table was updated, a relationship to another dynamic table, a display name, a database table name, a system name (e.g., a name used by the UMS to store and/or access data structures), and one or more flags (i.e., the table is a user-created table, the table is a system-created table, quick search ability is on or off, an administrator can define a field as one-to-many or many-to-many, a table owns or is the primary authority for a subject or type, and the table is an intermediary table), and group and/or a user. The field metadata identifies attributes or properties of the dynamic field. Examples of field metadata include created by, created when, edited by, edited when, a field identification (ID), a table ID, a foreign-key (identifying the table to which the foreign key is a part), a field type, a display name, a database field (alternately column), name, a data type (i.e., a precision number of a numeric field identifying length or number of decimal points, or a string length for a string field), a pointer for a look-up field (a pointer to a table for a one-to-one lookup or to an intermediary table for a one-to-many or many-to-many look-up), a hyperlink field (referring to a representative field or link for the field), a read-only flag, other flags, or a formula identifier (ID) identifying a table having a formula for that field.

The DCS 102 enables users to create a workflow for content through a workflow engine. The workflow can include one or more stages with one or more transitions. A stage is a point at which the applied workflow description occurs (for example, a content offering stage, a publication stage, creation stage, and editing stage). A transition defines how or when the content gets from a stage to a next stage or from an action to a next action. For example, a record may not be accessed in one example when it is published, however, a transition may enable a user to update the record before or after publication.

The workflow defines a non-linear (multi-pipelined) routing for the content. Thus, content is not required to be routed through one or more stages in the linear function.

The workflow also includes notifications, which can include a message transmitted to one or more users. For example, an authoring template may be used in the workflow engine to create the body of an email that can be sent in an authoring stage of the workflow.

The workflow engine processes or otherwise uses one or more triggers to determine when a content item enters a stage or action or leaves a stage or action. The trigger may be user defined or automatically defined, such as when a time period expires. The workflow defines the next action or next stage the workflow will enter based on the trigger.

The DCS 102 may store and/or retrieve workflow data in one or more tables, such as a metadata table or a database table. In one example, the workflow parameters, including for stages, transitions, and/or triggers, and including a workflow identity (ID) for the workflow stages, transitions, and triggers, are stored and/or retrieved by the DCS 102 in a table, such as a metadata table or database table in memory or a database.

The DCS 102 includes a formula engine to determine values in one or more fields of a record. For example, a formula may be defined for a field of a table or record (which would then generate the value to the corresponding field of the corresponding table or record), for binding a field of a table to another field of a table for which a calculation depends, or for defining an exception to a normal rule.

For example, a formula may be used to calculate a risk score of a risk analysis record. The formula would be defined in a risk analysis table having a risk score field. The formula may be based on the dynamic table definition or dynamic field definition or triggered based upon a calculation of another field (referred to herein as a dependent field). Thus, the trigger of the formula calculation may be based upon calculation of a value of a field for a different record.

The DCS 102 may store and/or retrieve formula data in one or more tables, such as a metadata table or a database table. In one example, the DCS 102 stores and/or retrieves one or more formulas in a formula table.

The DCS 102 receives permissions or permission parameters from users through an access control system. The permission parameters define access at multiple levels, including the table level, field level, record level, and workflow level. Permission parameters may be defined for one or more users and/or one or more groups. For example, users may be defined with roles, such as administrator, policy viewer, or other security role. When a user saves the permission parameters after entering the permission parameters, the DCS 102 creates a table with the permission parameters and creates meta-data that tracks the table definition for the permission table.

The DCS 102 may store and/or retrieve permission parameter data in one or more tables, such as a metadata table or a database table. In one example, the DCS 102 stores and/or retrieves one or more permission parameters in one or more access control tables.

A reporting engine retrieves data from records to a report based upon the metadata definitions for the tables and fields. The metadata definitions, including the table definitions and the field definitions, enable the reporting engine to generate a real-time preview of any report as it is constructed. For example, a user interface for the reporting engine enables a user to drag and drop fields from tables onto a report to define the layout of the report.

The DCS 102 enables a user to create a dynamic data entry form to design a layout of a displayed record from the relational database. For example, the dynamic data entry form layout may include one or more tabs that each includes data associated with that tab. In another example, content can be rendered in one column vertically or two columns vertically. The dynamic data entry form enables a user to drag and drop one or more fields into the dynamic data entry form to build the format and layout of the form.

Filters can be defined to limit records generated to the report, including date ranges, key words, numeric filters, servers on a network, IP addresses, and other filters. Permission parameters also can be set for the reports through the reporting engine that restrict who can access the report.

When a user has completed the report layout and report parameters, information describing the report is saved to metadata by the reporting engine. The report then can be generated real time against the database schema.

The reporting engine thus is able to generate dynamic content based upon the run time compilation of objects defined in the DCS 102 to dynamically retrieve content from database records. This enables the DCS 102 to generate various types of reports, including pie charts, other charts, and lists, and generate new data to a new report if a user clicks on or otherwise selects a piece of data in the original report (such as clicking on a pie wedge of a pie chart).

Traditional ORM systems are not able to operate on relational database records at run time. Thus, it is not dynamic and can not dynamically create content for tables and fields at run time. Whereas, the DCS 102 is an ORM system that is dynamic and can dynamically create content for tables and fields at run time.

The DCS 102 is able to dynamically, that is at run time, operate on the database records. The DCS 102 saves metadata associated with the tables and fields to detect changes in the table and field structures (e.g. the schema). For example, the DCS 102 stores table metadata definitions and field metadata definitions. The DCS 102 then recompiles its code at run time and executes the recompiled code to get data from, or store data to, the relational database.

The computers (computing devices) 104 and 106 each are a processing device, such as a personal computer, server computer, or mobile processing device. Other processing devices may also be used. The computing devices each have one or more processors that process software or other machine-readable instructions and memory to store the software or other machine-readable instructions and data. The memory includes volatile and/or non-volatile non-transitory memory. The computing device may communicate with the DCS 102 using wired and/or wireless communications through a direct connection or via a wired and/or wireless communication network.

The DCS 102 has a processing device having one or more processors and/or processing systems and one or more communication systems, such as a computer, server computer, or mobile processing device. Other processing devices may also be used. The one or more processors and/or processing systems of the DCS 102 process software or other computer/machine-readable/executable instructions and/or programming, including one or more of the dynamic content framework engine, the dynamic access control engine, the workflow engine, the formula engine, the dynamic meta-assembly engine, and/or the meta reporting engine. The DCS 102 has volatile and/or non-volatile non-transitory memory to store the software or other machine-readable/executable instructions and/or programming. The DCS 102 also has volatile and/or non-volatile non-transitory memory, including persistent memory, to store and/or cache metadata and/or data generated from or for the dynamic content framework engine, the dynamic access control engine, the workflow engine, the formula engine, the dynamic meta-assembly engine, or the meta-reporting engine. The engines may be, for example, modules, which are implemented as software, firmware, or other computer/machine, readable/executable instructions, programming, or code. The DCS 102 has a non-transitory computer readable medium/computer readable storage media on which the computer/machine readable/executable instructions for the one or more engines and/or modules are stored. The DCS 102 has one or more wired and/or wireless communication systems and/or interfaces that may communicate with one or more computers 104 and/or 106 using wired and/or wireless communication through a direct connection or via the wired and/or wireless communication network. The DCS 102 also may have, manage, and/or communicate with a relational database that has memory on which records are stored.

Figure 2:
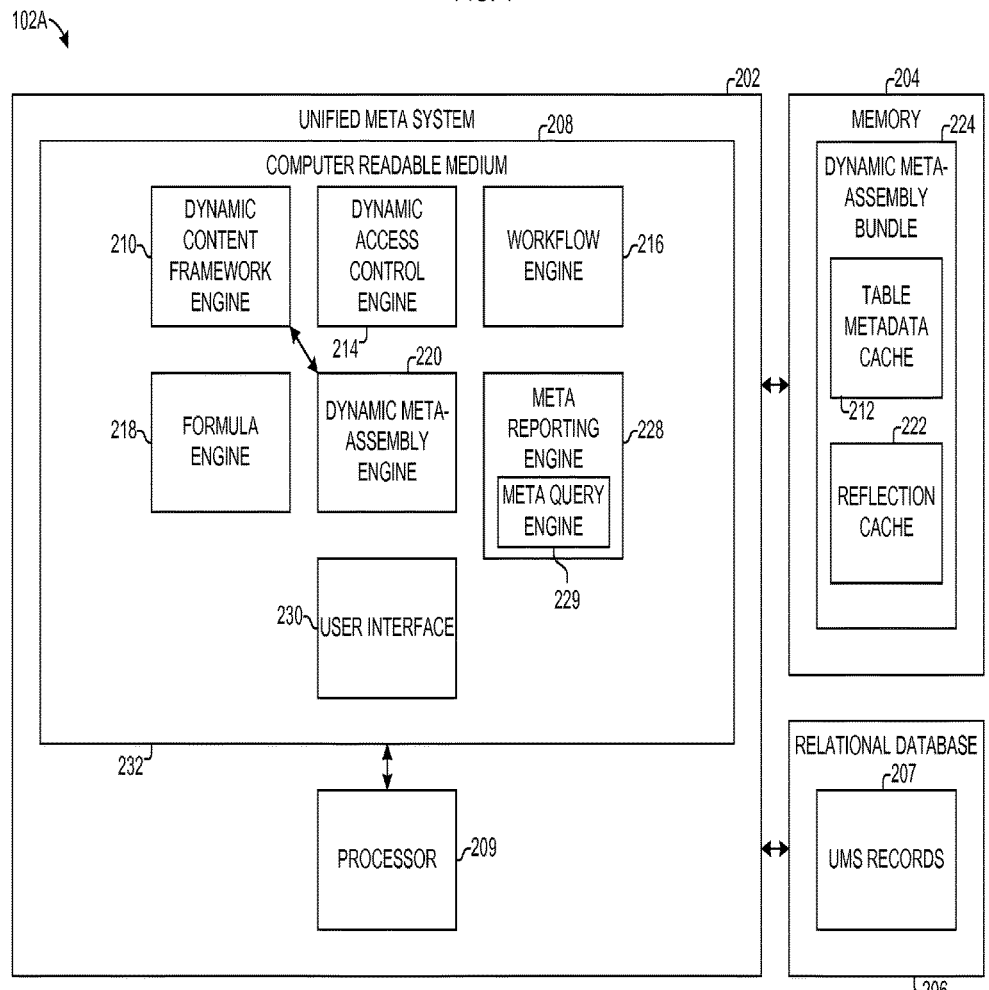
FIG. 2 is another block diagram of a dynamic content system.

A DCS 102A of FIG. 2 includes a unified meta system (UMS) 202, memory 204, and a relational database 206 with memory having one or more records 207. A computer readable medium 208 has one or more engines, systems, software, or instructions executed by a processor 209. The UMS 202 includes a dynamic content framework (DCF) engine 210 that stores table metadata and field metadata in a table metadata cache 212, a dynamic access control engine 214, a workflow engine 216, a formula engine 218, a dynamic meta-assembly engine 220 that stores reflection data in a reflection cache 222, a meta reporting engine 228, and a user interface 230. One or more of the engines 210-220 are organized as an application.

The DCF engine 210 enables end-users to alter the physical data model of tables, including table and field creation as well as defining arbitrary relationships between existing tables. The DCF engine 210 receives table and field structures (e.g. table physical structures and field physical structures), such as through user inputs. The table and field structures can be new or modified structures.

The DCF engine 210 employs physical model changes complete with true primary keys, foreign-keyed relationships, and text catalog integration in order to maintain the peak performance that is expected from discrete, natively-typed, indexed content traditionally enjoyed by statically-defined database models. In one example, a text catalog is a database-defined mechanism for parsing language-specific text that facilitates plural, tense, etc.—agnostic and/or homonym-style searching that is optimized for speed. A text catalog may be defined at the table level and includes one or more text fields. The text catalog optionally may include non-text fields. In one example, the language-specific text of a text catalog is set by the database, such as to US English units.

Figure 3:
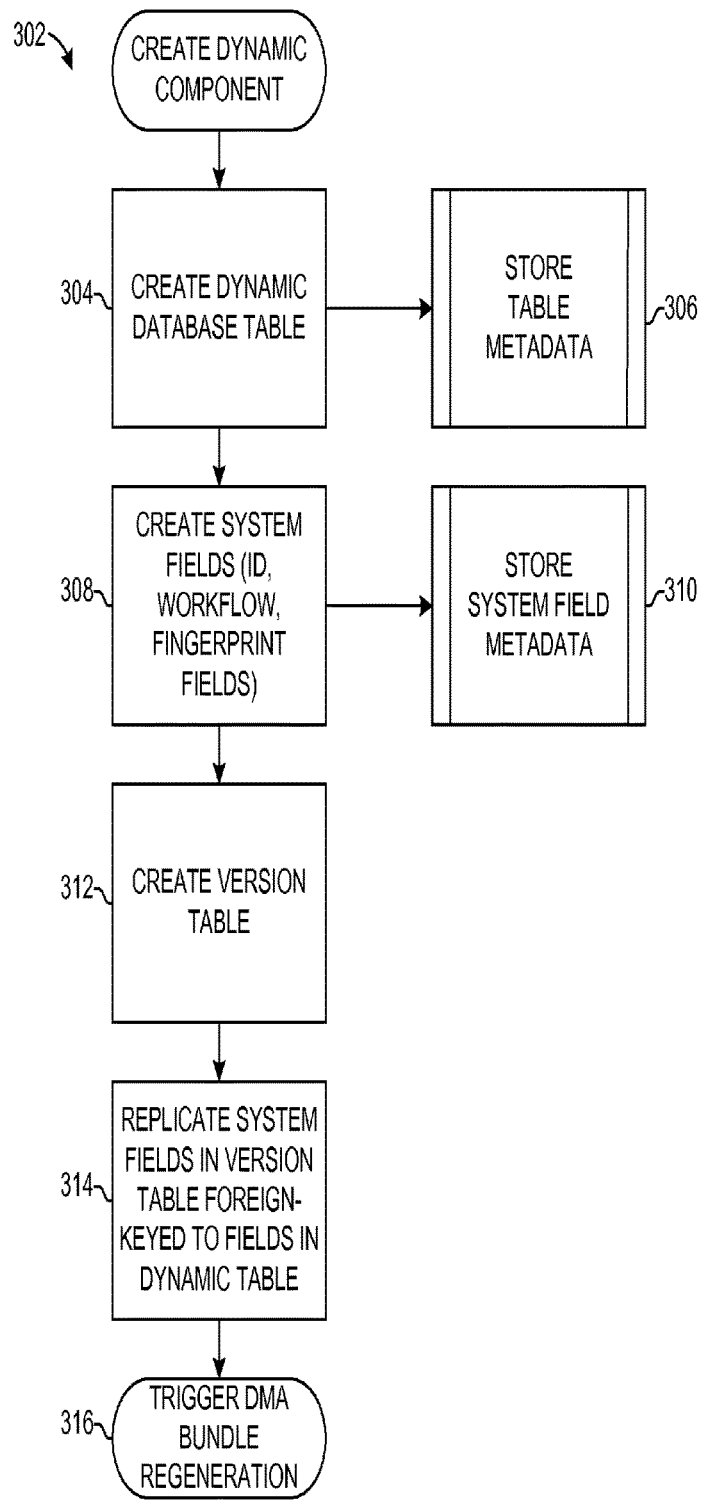
FIG. 3 is a flow diagram of a dynamic component creation process.
Figure 4:
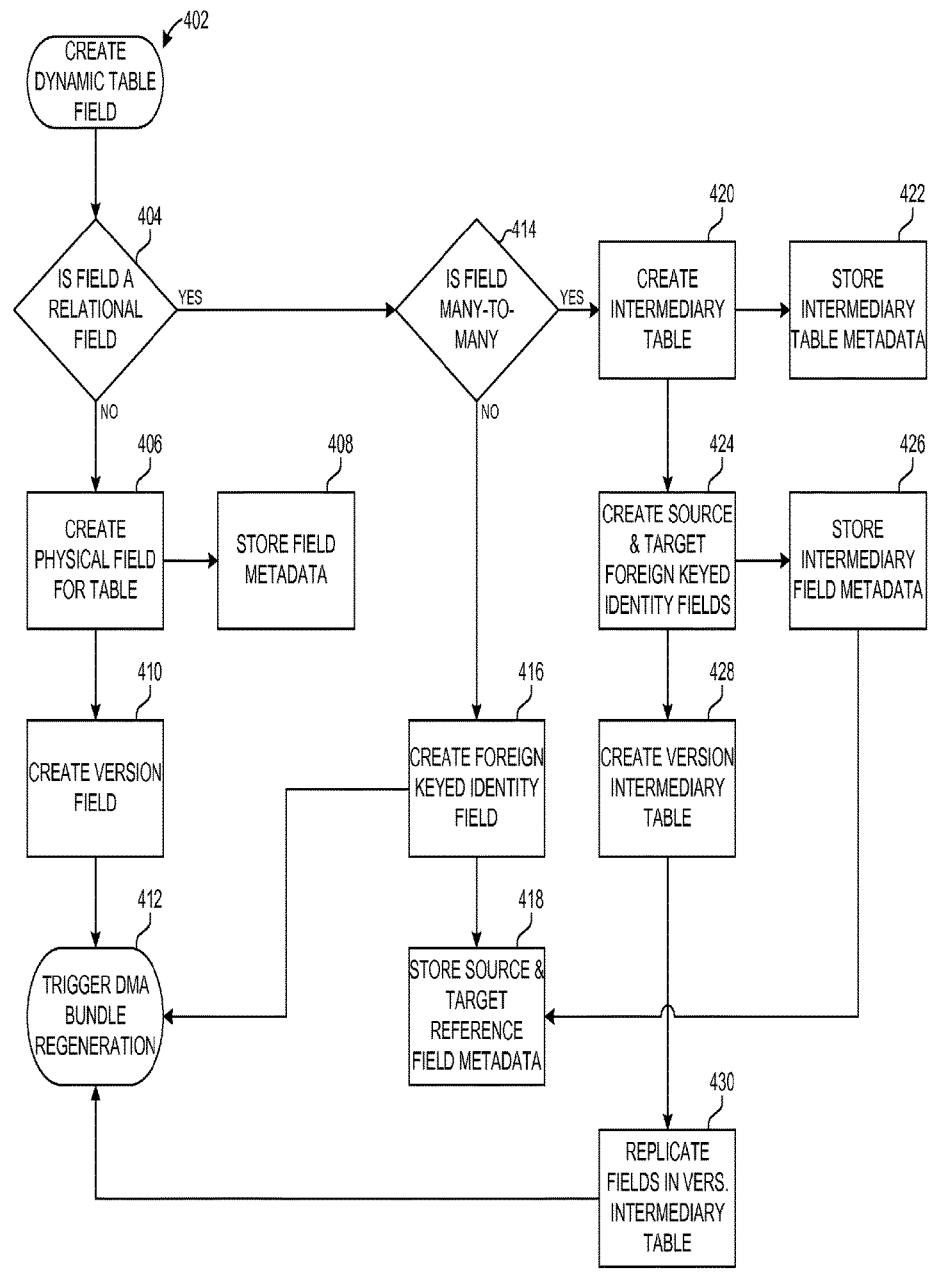
FIG. 4 is a flow diagram of a dynamic field creation process.

The DCF engine 210 receives table definitions for tables and field definitions for fields, including as discussed above with respect to the DCS. The functions of the DCF engine discussed below with respect to FIGS. 3 and 4 are incorporated herein by reference.

The DCF engine 210 creates and saves table metadata and field metadata describing the physical structures of the tables and fields, respectively, in a table metadata cache 212. The table metadata and field metadata may be saved, for example, in one or more metadata tables in memory. It is this runtime alteration of the table data model (for example, the structures of the tables and fields) and the corresponding metadata that is recorded (for example, for the tables structures and fields structures) that drives functionality and interaction of other UMS components.

The DCF engine 210 tracks the structural changes in its collection of metadata tables. In addition to an identifier, the DCF engine automatically creates a standardized set of fingerprint fields (Created By/At, Updated By/At) for its tables. It also creates versioned clones (copies) of tables and fields to maintain an audit trail for the full change history of the contained content. This includes created (new or modified) or deleted fields. It also integrates workflow parameters and permission parameters, such as those entered by the user.

The resultant user-defined content fields (for example, structural fields of structural tables) are most often configured to drive a similarly dynamic UI for content creation and/or subsequent maintenance. However, they can be tied to an arbitrarily-defined formula. The DCF engine 210 enables the addition/removal of primitive fields triggers that parallel modifications to both a base table and its versioned clone as are 1:n and n:n relational fields.

The dynamic access control engine 214 controls access to tables, fields in tables, records that populate tables, and workflow (including stages for a workflow item) based on user-defined access-parameters (permissions).

The dynamic access control engine 214 receives permission parameters and implements the permissions for those parameters, including for component-level access, record-level access, field-level access, and stage level access. Component-level access includes Create/Read/Update/Delete/Export (CRUDE) table-level access as applied to both static (system) content and dynamic (DCF) content. Record-level access is defined for records. For example, an administrative user can optionally choose to elevate access to an access-control field of a table when defining a relationship between a DCF table that targets either the User or Groups table.

Field-level access is defined for fields. For example, access can be defined (e.g. via the DCF engine) to grant Read and/or Edit access to Users and Groups.

Stage-level access can be defined for workflow stages. For example, workflow administrators have the option to restrict content rights based upon the workflow stage within which a given piece of content resides.

In one embodiment, an end user must qualify for all layers of access-control to be granted access to a given content record. This access-control is an example of a filtration, with the access-control parameters used by the UMS 202 (i.e. via the meta-query engine discussed below) as filtration parameters. In another embodiment, the access-control parameters apply for all controls representing relational content.

In one embodiment, content accessed via the UMS 202 (i.e. via the meta-reporting engine discussed below) will automatically have all of the relevant access-control filtration applied.

In one embodiment, the dynamic access control engine 214 stores and/or retrieves permission parameter data in one or more tables in memory, such as a metadata table or a database table. In one example, the dynamic access control engine 214 stores and/or retrieves one or more permission parameters in one or more access control tables. The one or more access control (permission parameter) tables each may have a table ID, and fields in the table may have an ID.

The workflow engine 216 controls content routing based on workflow-defined parameters (such as user defined workflow parameters received via the user interface). The workflow engine 216 enables user-defined programmatic enrollment, multi-pipelined (vs. linear) routing of content for DCF tables (dynamic tables defined through the DCF engine 210) and static system tables. The workflow engine 216 enables workflow creators to define arbitrary criteria to determine which workflow(s) apply to a given piece of content, including one or more workflow stages, one or more workflow transitions, and one or more workflow triggers. Other examples of workflow options, and the workflow parameters, are described above and in the user interface screen views and apply herein. If more than one workflow is applicable for a given piece of content, the user may be prompted to choose among the candidate workflows or the content can be automatically enrolled in a given workflow stack.

In one embodiment, the workflow engine 216 stores and/or retrieves workflow data in one or more tables, such as a metadata table or a database table in memory or a database. In one example, the workflow engine 216 stores and/or retrieves one or more the workflow parameters, including for stages, transitions, and/or triggers, and including a workflow identity (ID) for the workflow stages, transitions, and triggers in one or more workflow tables. The one or more workflow tables each may have a table ID, and fields in the table may have an ID.

The formula engine 218 calculates values for fields in tables and populates those values in the records associated with the tables and in records associated with other tables. The formula engine 218 can be configured to draw data from any number of the given record's properties (e.g. Person.Gender) or any property derived from any relation at any depth (e.g. Person.PrimaryCar.Alternator.YearOfManufacture).

Because detailed metadata for the tables and fields is maintained by the DCF engine 210, the formula engine 218 can seamlessly and efficiently detect and re-compute fields affected by a formula change or other fields dependent upon changes to a primary field based not just on direct property changes but changes to any relationship intersected by a given formula.

The formula engine 218 has a detection engine that detects changes to records, including changes to properties of other records on which the current record relies. For example, for a formula on a user-defined "Person" table, using a Person.PrimaryCar.Alternator.YearOfManufacture property, a modification does not need to occur directly on the field or record for which the formula is related. Instead, the detection algorithm in the formula engine detects changes to the Primary Car record a particular person is dependent upon, the Alternator record upon which that Primary Car is associated with, or even if that Alternator record itself has been modified. In one example, the detection engine detects changes in the metadata.

The addition/removal of primitive fields triggers parallel modifications to both the base (original) table and its versioned counterpart as are 1:n and n:n relational fields. Creating or removing an n:n field, however, results in the formula engine 218 constructing or destructing of an intermediary table (as further described below).

In one embodiment, the formula engine 218 stores and/or retrieves formula data in one or more tables, such as a metadata table or a database table in memory or a database. In one example, the formula engine 218 stores and/or retrieves one or more formulas in one or more formula tables. The one or more formula tables each may have a table ID, and fields in the table may have an ID.

The dynamic meta-assembly engine 220 targets and maps the structure of a reference database to generate a representation file representing the database's model, such as a DataBase Markup Language (DBML) file, which in one example is an eXtensible Markup Language (XML) file or XML file representation of the database's model. The dynamic meta-assembly engine 220 generates the source code for a collection of objects that represent that database's structure. This source code is then compiled and used to access the database.

In one embodiment, the dynamic meta-assembly engine 220 modifies the XML file representation (or other DBML file representation or other file representation) to adjust the names and/or relational cues in the XML to correspond with the flags (for example, as identified in the metadata) stored by the DCF engine 210 (and optionally by the other UMS engines) as part of the metadata. The dynamic meta-assembly engine 220 then creates classes (such as LINQ classes) from the modified XML file representation and modifies the classes to derive the base properties and methods from the UMS Record base class. The dynamic meta-assembly engine 220 then compiles the source code into a runtime (dynamically generated) data link library (DLL) (or other DBML file representation or other file representation). In this context, creating classes means creating source code based on the modified XML file representation (or other DBML file representation or other file representation). The dynamic meta-assembly engine 220 stores the runtime DLL in the memory 204, where it is available for execution.

In object oriented language systems, classes are typically a combination of any number of methods and properties. A feature of object oriented languages is the ability for one class to inherit the properties of another while optionally overriding them and/or adding more of its own. An object is said to be "derived" from another if it uses the other class as a base class (such as referring to that class as the source from which it extends its own functionality). An example of a base class would be Car. The Car class would exhibit all of the core features that one might associate with a car. Another class, say SportsCar, would derive/inherit from the base class Car and, possibly, define additional properties and methods that relate specifically to a SportsCar beyond the more general traits it gained by inheriting from the Car class. In that context, the dynamic meta-assembly engine 220 alters the root table classes defined in the source code file to inherit from the UMS Record base class, thus injecting the accessor attributes elaborated on herein into each of the runtime generated classes.

In another example, the dynamic meta-assembly engine 220 generates the XML file representation, modifies the XML file representation based on flags stored by the DCF engine, creates source code based on the modified XML file representation, optionally modifies the source code so that the classes representing the source code have at least the base methods and properties as the Record base class, and then creates the runtime DLL from the source code or optionally modified source code. The dynamic meta-assembly engine 220 stores the runtime DLL in the memory 204, where it is available for execution.

In another example, the dynamic meta-assembly engine 220 does not modify the source code or otherwise modify the classes with the Record base class. In this example, the dynamic meta-assembly engine 220 generates the XML file representation, modifies the XML file representation based on flags stored by the DCF engine, creates source code based on the modified XML file representation, and then creates the runtime DLL from the source code. The dynamic meta-assembly engine 220 stores the runtime DLL in the memory 204, where it is available for execution.

Once the dynamically generated DLL is loaded into memory, the dynamic meta-assembly engine 220 crawls the resultant classes via type introspection (also referred to as reflection) and cross-references the classes and their properties with the table metadata and field metadata, field properties, and relational and inter-relational bindings for optimal runtime lookup. The dynamic meta-assembly engine 220 stores the object/property/relational reflective property mappings in the reflection cache 222 in memory 204. This cumulative cache of metadata and object/property/relational reflective property mappings is referred to as the meta-assembly bundle 224. In one embodiment, this functionality is domain-partitioned to accommodate multi-tenant environments.

In one example, introspection refers to the consumption of the cached reflection information contained within the meta-assembly bundle. For example, introspection includes walking relationships between objects and caching those relationships between the objects. Thus, the meta-assembly bundle 224 in this example results from the runtime construction and compilation of classes (objects), loading the compiled classes (objects) into memory, and subsequent caching the metadata and the information derived and cached from reflectively traversing the compiled classes. The assembly in this example is a compiled code library, and the runtime compilation generates a runtime assembly (e.g. DLL) built from code derived from a fusion of metadata derived from scanning the database's physical structure and system metadata.

In another example, in the cross-referencing process, the dynamic meta-assembly engine 22 loads one or more data items gleaned from the reflection and maps those one or more data items to one or more in-memory lookup collections that make up the dynamic meta-assembly bundle.

In another embodiment, the dynamic meta-assembly engine 220 maps the structure of a reference database to generate a DBML file or other file representation. The dynamic meta-assembly engine 220 generates the source code for a collection of objects that represent that database's structure. This source code is then compiled and used to access the database.

The dynamic meta-assembly engine 220 uses the metadata from the table metadata cache to modify the DBML file. The dynamic meta-assembly engine 220 creates an assembly and loads the assembly. The dynamic meta-assembly engine 220 scans the assembly via reflection, and saves reflection data to the reflection cache.

In prior systems, runtime derived types generated by an assembly offer no intrinsic means of accessing their content. Regardless of whether the property name is a predictable derivation of the user-provided field name or if the name is arbitrarily chosen at render time by the object-graphing tool (as often happens for the non-owner side of a foreign-key relation), there is no predictable means for a developer to derive that name at runtime.

However, the UMS Record class is injected in some embodiments by the dynamic meta-assembly engine 220 of the UMS 202 as the base for all of the runtime-generated classes (during the class generation phase of the meta-assembly bundle initialization). While the actual property names may not be predictable at runtime, the metadata identifiers representing them are, and a feature of the meta-assembly bundle's cache is that its relational introspection is name-agnostic. As a result, the UMS Record class offers a simple accessor that accepts an identity for a metadata field that can be used for accessing the object's internal property (e.g. record[100]//Translates to userRecord.Name.). In effect, the cached property bindings (in this case, keyed by field IDs) are used to quickly and discreetly extract the data from the object at runtime via reflection. Likewise, property paths can be defined to traverse relational data to whatever depth is desired (e.g. record[new int[ ] {55, 12, 315}]//Translates to userRecord.PrimaryResidence.FrontDoor.Color.). In other embodiments, the Record class is not injected as the base for all of the runtime-generated classes.

The meta-reporting engine 228 generates reports against static and dynamic content, including UMS records. The reporting can be filtered by access permissions and/or workflow parameters. The meta-reporting engine 228 thus accesses and retrieves data from one or more workflow tables and/or access control tables. The meta-reporting engine 228 is driven by a meta-query engine 229, which also incorporates filtration of parameters.

By recording structural metadata for both static system tables and dynamically-defined tables, the meta-reporting engine 228 can report against any static content and/or dynamic content in or associated with the UMS 202. Due to the UMS's fusion of classes in the meta-assembly engine and deep relational introspection, report filtration transcends beyond type typical mundane operations (=, <, >, >=, etc.) against primitive data types (integer, decimal, date, string, etc.) by allowing relational filtering (by the meta-reporting engine 228) to any arbitrary nesting depth (constrained only by the limitations of the targeted database). Results can also be aggregated by similarly dynamic criteria for supporting representative charts and graphs.

The meta-reporting engine 228 has a meta-query engine that enables querying and reporting of content. As with the UMS Record base class, the meta-query engine 229 facilitates development of runtime data querying via identity base property (or property path) access in combination with filtration operators and corresponding values.

The meta-query engine 229 emulates realtime what a compiler would have done for a static model. Many ORM variants allow an expression to be cumulatively amended but never invoked until an attempt is made to access the data. This facilitates the efficient use of popular development practices in which core data API classes apply fundamental filtering, for example licensing or permission filtering, against which consumers apply their own filtering, only to pass that data to a control that may itself impose its own criteria (e.g. page 2 of records assuming a page size of 50). The meta-query engine 229 uses an alternative syntax of an ORM environment to encapsulate the complexity of the classes in a way that preserves any load-on-demand capabilities of the generated expression. Thus, the meta-query engine 229 does not touch an object until the query expression is complete. This preserves both database and development efficiency.

When the meta-query engine applies a filter, it iteratively 'walks' the provided field path and dynamically constructs a query expression tree mapping each node of the path via reflective instantiation of templatized expressions. In effect, this provides a breadcrumb trail from the meta-query engine's working object through its relationships with other objects (regardless of directionality) to the resultant property for which the operator and value(s) will be applied. The meta-query engine logically binds multiple filters by and/or expressions. The meta-query engine also detects and logically fuses implicit relationships between filters. For example, "any person with a red car and a Sports Car" is not the same as "any person with a red Sports Car". The meta-query engine conditions the expression as "any person with a red car and a Sports Car" in the fusion.

The meta-query engine 229 applies an optional aggregation layer to support condensed data views, such as charts and graphs. Grouping and aggregation methods can be applied by the meta-query engine to the results of filters. As with the filtration expressions, the grouping and aggregation are translated by the meta-query engine 229 into expressions. In turn, these expressions are used by the meta-query engine 229 to overlay the expression derived from the initial filtering query. Since the cumulative expression does not have an existing data structure or class to render its contents into, a new type is dynamically synthesized at runtime by the meta-query engine 229. Then, again via reflection, the cumulative expression is rewired to route its results into the new purpose-built type. Results then may be generated to via the user interface, such as upon execution of the new type.

A user interface 230 receives and/or provides data and/or instructions from and/or to one or more computers or other computing devices, including user inputs, generates data for display, and/or provides instructions for displaying data. The user interface 230 displays data from the UMS 202, including one or more displays and/or user interface screens, and enables a user to enter data and/or instructions. The user interface 230 may be embodied in or operate using one or more processors or processing systems, such as with the display system. The user interface 230 may also be embodied in or operate using one or more distributed or integrated systems and/or computer-readable media. The user interface 230 is optional for some aspects.

The memory 204 is volatile and/or non-volatile memory to store and/or cache metadata and/or data generated from or for the UMS 202, including the dynamic content framework engine 210, the dynamic access control engine 214, the workflow engine 216, the formula engine 218, the dynamic meta-assembly engine 220, and/or the meta-reporting engine 228. For example, the memory 204 stores a dynamic meta-assembly bundle 224 that includes table metadata and/or field metadata in a table metadata cache 212 and reflection data in a reflection cache 222.

The memory 204 stores a table metadata cache 212 that includes the table metadata and/or field metadata. The memory 204 also stores the reflection cache 222 that has the reflective property mappings. The table metadata cache 212 and the reflection cache 222 collectively are the dynamic meta-assembly bundle 224, which is a cumulative cache of table and field metadata and reflective property mappings.

The relational database 206 stores and retrieves records for the UMS 202 and other relational data. In one example, a relational database includes a relational database management system. In another example, the relational database includes volatile and/or non-volatile memory and one or more processors and may be a data storage structure or a data storage system executed by the one or more processors on a data storage server to execute the storage and retrieval of the (relational data) records. In another example, records are stored and/or retrieved using one or more structured query language (SQL) commands generated via mapping of the UMS entity objects.

Records have properties that correspond to discrete data elements. The records include static and/or dynamic content associated with static and/or dynamic tables. The relational database (and/or the memory) also stores other parameters, including workflow parameters and access-parameters/permissions.

The computer readable medium 208 may be volatile media, nonvolatile media, removable media, non-removable media, and/or other media or mediums that can be accessed by a general purpose or special purpose computing device. For example, the computer readable medium 208 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. In one example, an engine is a module. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The processor 209 is one or more processors or processing systems that execute instructions, such as embodied by/in one or more of the dynamic content framework engine 210, workflow engine 216, dynamic access control engine 214, formula engine 218, dynamic meta-assembly engine 220, meta reporting engine 228, and user interface 230. The processor executes one or more modules, engines, systems, or frameworks, such as one or more of the dynamic content framework engine 210, workflow engine 216, dynamic access control engine 214, formula engine 218, dynamic meta-assembly engine 220, meta reporting engine 228, and/or user interface 230, that are stored on a computer readable medium 208. One or more of the engines 210-220 are organized as an application that executes on the processor 209. The processor also executes one or more applications that are embodied on computer/machine-readable/executable media, such as the computer readable medium 208 or another computer readable medium, or receives and transmits communications from and to an external application system executing the applications.

Combinations and permutations of the systems and components described herein may be made.

FIG. 3 depicts an exemplary embodiment of a dynamic component creation of the DCF engine 210, such as for a dynamic table. In the dynamic component creation process 302, the DCF engine 210 creates a dynamic database table at 304 based upon one or more table definitions, such as one or more table parameters received from a user. The table parameters may include, for example, a display name for the dynamic table, a database table name, a description, a table type, workflow parameters, and/or table permission parameters. The table created by the dynamic field creation process 302 may be a newly added table or a modified table.

The DCF engine 210 stores table metadata for the created dynamic table at 306. The table metadata describes the structure and the identity of the dynamic table. Examples of table metadata are a table identifier, an identifier indicating who created the dynamic table, an identifier indicating when the dynamic table was created, an identifier indicating who updated the table, and an identifier indicating when the table was updated, a relationship to another dynamic table, a display name, a database table name, a system name (e.g., a name used by the UMS 202 to store and/or access data structures), one or more flags (i.e., the table is a user-created table, the table is a system-created table, quick search ability is on or off, an administrator can define a field as one-to-many or many-to-many, a table owns or is the primary authority for a subject or type, and the table is an intermediary table), a group, and/or a user.

At 308, the DCF engine 210 creates system fields for the dynamic table. The system fields are added to the dynamic table by altering the database model for the dynamic table to add the system fields to the dynamic table. This process may be referred to herein as creating or adding physical fields to or for a table. System fields may include, for example, a table identifier (ID), a default work flow, and/or one or more fingerprint fields (fields identifying who created the table, when the table was created, who edited the table, and when the table was edited). Table fields may alternately be referred to as table columns.

At 310, the DCF engine 210 stores metadata describing the system fields for the dynamic table. The system field metadata may include, for example, the table ID, workflow, and/or the finger print fields.

At 312, the DCF engine 210 creates a version table. The version table is a duplicate of the original dynamic table created at 304, but with a version identifier (ID) identifying the version of the dynamic table. For example, the version ID may be a sequential version number identifying a particular version of the table when the table is created or modified. The collection of version tables creates an audit history of each version of a table created or modified by the DCF engine 210, including the table parameters (attributes) received from users.

The version table may include all or fewer than all the fields created for the core dynamic table. For example, the version table may have all columns except for the created by and created at fields.

At 314, the DCF engine 210 replicates the system fields contained in the dynamic table in the version table and creates a primary—foreign key relationship from the system fields in the original dynamic table to the system fields in the version table. At 316, the DCF engine 210 then triggers regeneration of the dynamic meta-assembly (DMA) bundle.

In one example, the regeneration trigger initiates execution of the dynamic meta-assembly engine 220 to generate or regenerate the dynamic meta-assembly bundle 224. In this context, the regeneration trigger updates the dynamic meta-assembly bundle 224. For example, the DCF engine 210 transmits a trigger to the dynamic meta-assembly engine 220, which receives the trigger and generates or regenerates the dynamic meta-assembly bundle 224.

In another example, the regeneration trigger causes the dynamic meta-assembly engine 220 to generate the XML file (or other DBML file representation), modifies the XML file (or other DBML file representation) based on flags stored by the DCF engine 210, creates source code based on the modified XML (or other DBML file representation), optionally modifies the source code so that the classes representing the source code have at least the base methods and properties as the Record base class, and then creates the runtime DLL from the source code or optionally modified source code. The dynamic meta-assembly engine 220 stores (loads in memory) the runtime DLL in the memory, crawls the resultant classes via type introspection (also referred to as reflection), cross-references the classes and their properties with the table metadata and field metadata, field properties, and relational and inter-relational bindings for optimal runtime lookup, and stores the object/property/relational reflective property mappings in the reflection cache. This cumulative cache of metadata and object/property/relational reflective property mappings is the meta-assembly bundle.

FIG. 4 depicts an exemplary embodiment of a dynamic field creation process of the DCF engine 210. In the example FIG. 4, a dynamic field creator process 402 creates one or more fields based on one or more field parameters. For example, the field parameters may be received via user input or as DCF system field parameters. The field created by the dynamic field creation process 402 may be a newly added field or a modified field. In addition, fields may be deleted.

At 404, the DCF engine 210 determines if the field to be created is a relational field, such as by examining the field parameters. A relational field is a field that relates to one or more fields in one or more tables, including under a one-to-many relationship or a many-to-many relationship. One-to-many (1:n) means that each record in the table for which the relationship is being defined can refer to exactly one record in the targeted table. Many-to-many (n:n) means that each record in the table for which the relationship is being defined can relate to one or multiple records in the targeted table.

If the field is not a relational field at 404, the DCF engine 210 creates a physical field for the dynamic table at 406. Creating a physical field includes altering the database model for the table to add the field to that table. Conversely, deleting a physical field means altering the database model to delete the field from the table, and modifying a physical field means altering the database model to modify the field. In this instance, the added field may be a user-added field based upon one or more user inputs.

At 408, the DCF engine 210 stores field metadata describing the created (i.e. new or modified) field. Non-limiting examples of field metadata include created by, created when, edited by, edited when, a field identification (ID), a table ID, one or more foreign-key(s) (identifying the table or tables to which the foreign key is a part), a field type, a display name, a database field (alternately column), name, a data type (i.e., a precision number of a numeric field identifying length or the number of digits after a decimal point, or a string length for a string field), a pointer for a look-up field (a pointer to a table for a one-to-many lookup or to an intermediary table for a many-to-many look-up), a hyperlink field (referring to a representative field or link for the field), a read-only flag, other flags, or a formula identifier (ID) identifying a table having a formula for that field.

At 410, the DCF engine 210 creates a version field for the added field. The version field is a copy of the created field, but includes an associated version identifier (ID) identifying the version of the created field. For example, the version ID may be a sequential version number identifying a particular version of the field when the field is created. The collection of version fields creates an audit history of each version of a field created by the DCF engine 210, including the field parameters received from users.

At 412, the DCF engine 210 triggers generation or regeneration of the dynamic meta-assembly bundle 224. In this regard, the regeneration is an update to the dynamic meta-assembly bundle 224. For example, the DCF engine 210 transmits the trigger to the dynamic meta-assembly engine 220, which receives the trigger and generates or regenerates the dynamic meta-assembly bundle 224.

In one example, the regeneration trigger initiates execution of the dynamic meta-assembly engine 220 to generate or regenerate the dynamic meta-assembly bundle 224. In this context, the regeneration trigger updates the dynamic meta-assembly bundle.

In another example, the regeneration trigger causes the dynamic meta-assembly engine 220 to generate the XML file (or other DBML file representation), modifies the XML file (or other DBML file representation) based on flags stored by the DCF engine 210, creates source code based on the modified XML file (or other DBML file representation), optionally modifies the source code so that the classes representing the source code have at least the base methods and properties as the Record base class, and then creates the runtime DLL from the source code or optionally modified source code. The dynamic meta-assembly engine 220 stores (loads in memory) the runtime DLL in the memory, crawls the resultant classes via type introspection (also referred to as reflection), cross-references the classes and their properties with the table metadata and field metadata, field properties, and relational and inter-relational bindings for optimal runtime lookup, and stores the object/property/relational reflective property mappings in the reflection cache. This cumulative cache of metadata and object/property/relational reflective property mappings is the meta-assembly bundle 224.

If the field is a relational field at 404, the DCF engine 210 determines if the field is a one-to-many field or a many-to-many field at 414. A one-to-many field specifies that each record in the source table for which the relationship is being defined can refer to exactly one record in the targeted table. A many-to-many field specifies that each record in the source table for which the relationship is being defined can relate to one or multiple records in the targeted table.

If the field is a one-to-many field at 414, the DCF engine 210 creates a foreign keyed identity field at 416. The foreign keyed identity field defines the relationship between the created (source) field in the dynamic (source) table and a target field in a target table. At 418, the DCF engine 210 stores metadata describing the source field (also referred to as the primary keyed field) and the target field (also referred to as the foreign keyed field).

If the field is a many-to-many relational field at 414, the DCF engine 210 creates an intermediary table at 420. The intermediary table contains identifier pairs that identify the source field and target field for each relationship (identifier pairs). Thus, the intermediary table represents the primary key-foreign keyed identities related to the field. At 422, the DCF engine 210 stores intermediary table metadata describing the intermediary table. The intermediary table metadata contains, for example, the primary key-foreign keyed identities describing the source and target tables.

At 424, the DCF engine 210 creates the source and target foreign keyed identity fields, which includes physically creating the identity fields in the intermediary table for the identity fields. At 426, the DCF engine 210 stores intermediary field metadata describing the source and target foreign keyed identity fields. The intermediary field metadata contains, for example, the primary key-foreign keyed identities describing the source and target fields.

At 428, the DCF engine 210 creates a version of the intermediary table, which is a copy of the intermediary table with a version ID. For example, the version ID may be a sequential version number.

The DCF engine 210 replicates the source and target foreign keyed identity fields from the intermediary table in the version intermediary table at 403. The DCF engine 210 then triggers regeneration of the dynamic meta-assembly bundle at 412.

In one example, the regeneration trigger initiates execution of the dynamic meta-assembly engine 220 to generate or regenerate the dynamic meta-assembly bundle 224. In this context, the regeneration trigger updates the dynamic meta-assembly bundle 224. For example, the DCF engine 210 transmits the trigger to the dynamic meta-assembly engine 220, which receives the trigger and generates or regenerates the dynamic meta-assembly bundle 224.

In another example, the regeneration trigger causes the dynamic meta-assembly engine 220 to generate the XML file (or other DBML file representation), modifies the XML file (or other DBML file representation) based on flags stored by the DCF engine 210, creates source code based on the modified XML file (or other DBML file representation), optionally modifies the source code so that the classes representing the source code have at least the base methods and properties as the Record base class, and then creates the runtime DLL from the source code or optionally modified source code. The dynamic meta-assembly engine 220 stores (loads in memory) the runtime DLL in the memory, crawls the resultant classes via type introspection (also referred to as reflection), cross-references the classes and their properties with the table metadata and field metadata, field properties, and relational and inter-relational bindings for optimal runtime lookup, and stores the object/property/relational reflective property mappings in the reflection cache. This cumulative cache of metadata and object/property/relational reflective property mappings is the meta-assembly bundle.

Figure 5:
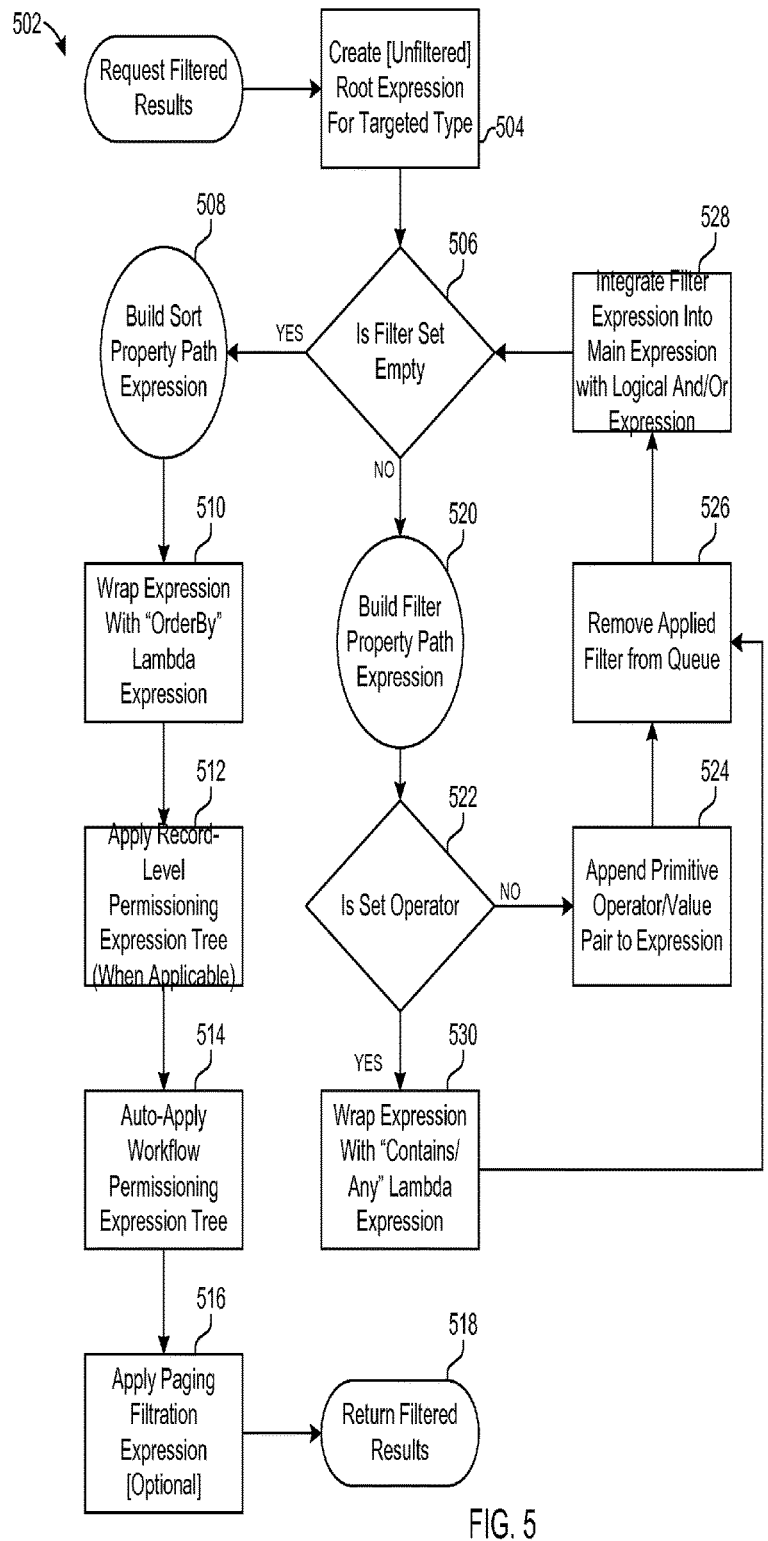
FIG. 5 is a flow diagram of a request filter results process for a meta-query engine.

FIG. 5 depicts an exemplary embodiment of a filtered results process for a meta-query engine 229. The filtered results process 502 creates a root table object for the targeted object type at 504. The root table object is a representative object that does not include filters and is for a particular type of the object. For example, a type might be a user table. Other examples exist.

At 506, the filter results process of the meta-query engine determines if the set of filters for the query is empty. The filter set may, for example, be stored or held in a queue.

Figure 6:
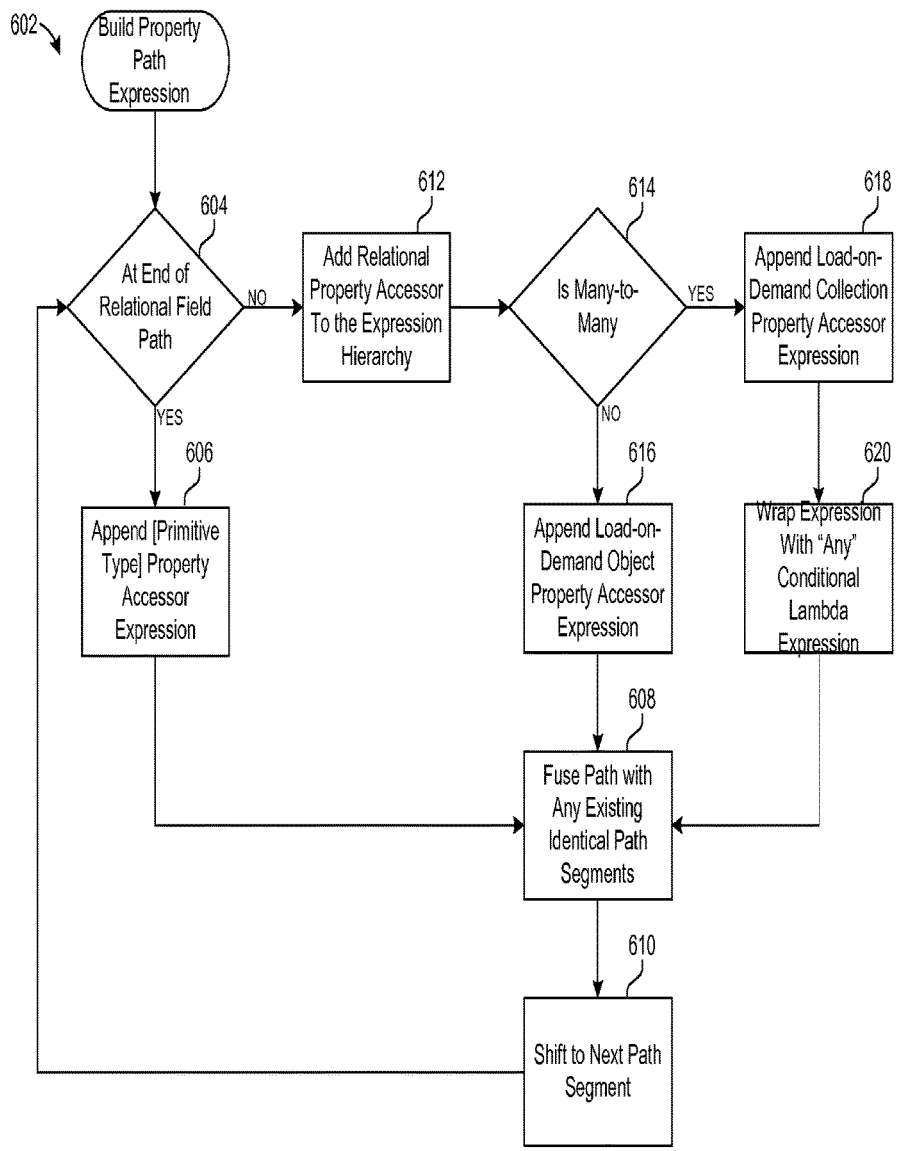
FIG. 6 is a build property path process for a meta-query engine.

If the filter set is empty at 506, the filter results process builds a sort property path expression at 508 using the build property path expression identified in FIG. 6. The filtered results process then wraps the property path expression with an "OrderBy" lambda expression at 510 and applies a record-level permissioning expression tree when applicable at 512. The record level permission expression tree identifies the permission parameters assigned to records.

The filtered results process then automatically applies a workflow permissioning expression at 514, which includes the workflow permission parameters specified for the records (identified in the root table object of the targeted type). The filtered results process applies a paging filtration expression at 516, which identifies the number of records that will appear on a page or a size of that page. At 518, the filtered results process then retrieves the records meeting the sort, filter, and paging criteria and returns the results for further interaction, such as display to the user, downloading, printing, or other reporting.

If the filter set is not empty at 506, the filtered results process builds a filter property path expression at 520 using the build property path expression process of FIG. 6. At 522, the filtered results process determines if the operator is a primitive operator/value pair or a set operator (i.e., an operator for a set or collection of objects). If the operator is a primitive operator/value pair at 522, the filter results process appends the primitive operator/value pair to the property path expression at 524 and removes the applied filter from the queue holding the filter set at 526. The filter expression is then integrated into the main expression using a logical and/or expression at 528. The process then returns to step 506.

At 522, if the operator is a set operator, the filtered results process wraps the property path expression with a "Contains/Any" lambda expression at 530, removes the applied filter from the queue holding the filter set at 526, and integrates the filter expression into the main expression using a logical and/or expression at 528. The process then continues to step 506.

FIG. 6 depicts an exemplary embodiment of a build property path expression process for the meta-query engine 229. The build property path expression process 602 builds a property path expression that maps to a field of a table as identified by the relational field path of that field. A relational field path identifies the field in the table and has one or more path segments that correspond to a field in a table.

If the build property path expression process has identified the end of the relational field path at 604 (i.e. there are no more segments in the relational field path), it appends a primitive type property accessor expression at 606. An accessor is used to access a table's content.

The build property path expression process then fuses the path expression with any existing identical path segments at 608. The fuse or fusion combines the identical path segments with the path expression to condition (non-Boolean limited) the expression with the one or more path segments.

At 610, the build property path expression process shifts to the next path segment in the relational path. The process then returns to step 604.

At 604, if the build property path expression process is not at the end of the relational field path, the process adds a relational property accessor to the property path expression at 612.

The process then determines if the field represented by the current segment is a many-to-many field. If the field is a many-to-many field at 614, the process appends a load-on-demand object property accessor expression to the property path expression at 616 and continues to step 608. If the field is not a many-to-many field at 614, the process appends a load-on-demand collection property accessor expression to the property path expression at 618 and wraps the property path expression with an "Any" conditional lambda expression at 620. The process then continues to Step 608.

Figure 7:
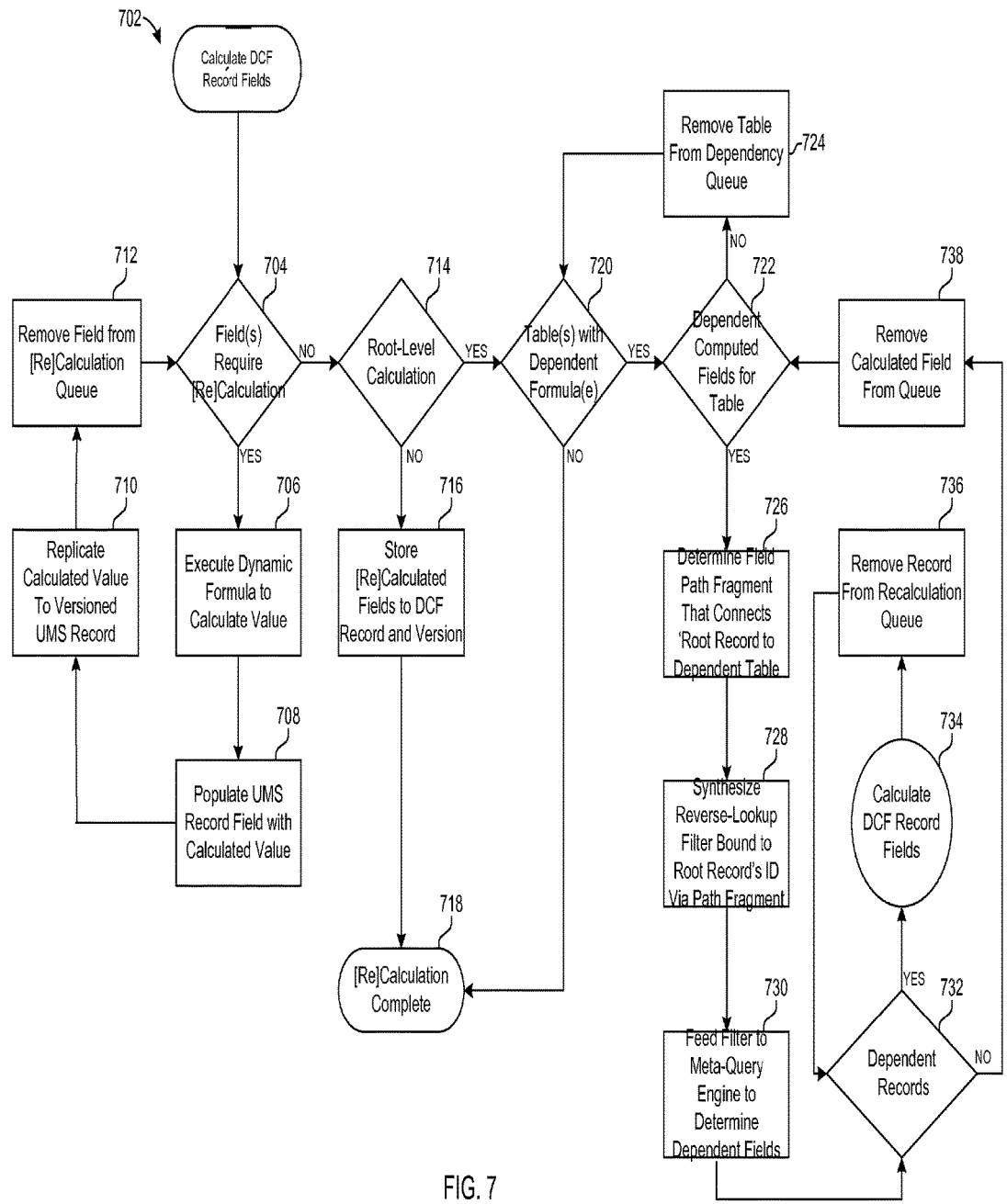
FIG. 7 is a flow diagram of a relational cascading calculation detection engine for a formula engine.

FIG. 7 depicts an exemplary embodiment of a calculate record fields process for relational cascading calculation and recalculation detection for a formula engine. The calculate record field's process 702 determines if one or more fields require calculation or recalculation at 704. For example, the metadata for a field identifies that field as having or not having an associated formula. The calculate records field process examines the metadata to determine if a formula is associated with a field. The metadata also points to a formula table in which the formula for the field is identified. The fields may be identified in a calculation queue.

If the field has an associated formula 704, the process executes the formula to calculate a value for that field at 706 and populates the corresponding record field with the calculated value at 708. The calculate record fields process then replicates the calculated value to a version of the record at 710 and removes the field from the calculation queue at 712. The versioned record is a copy of the original record with a version identifier. The process then continues to step 704.

If no fields require calculation or recalculation at 704, the process determines if a root-level calculation is required at 714. The root-level calculation decision determines if the calculation of another record field spawned the calculation of the current record field or if the calculation originated from the current record. If it is not a root-level, the process stores the calculated field to the UMS record and the versioned record at 716. The process is then complete at 718.

If the calculation is a root-level calculation at 714, the process determines one or more tables with one or more formulas dependent on the calculation at 720. For example, other tables may have records that rely on values calculated in the current table. If no tables have formulas dependent on the calculation of the current field at 720, the process is complete at 718. If one or more tables do have dependent formulas at 720, the fields for the table dependent on the current calculation are determined at 722. The identification of the tables with dependent formulas may reside in a queue, and the dependent computed fields may be identified in a queue. If there are no dependent computed fields at 722, the table is removed from the table dependents queue at 724.

If a formula for a field of a table is dependent on the current calculation at 722, the calculate record field's process 702 determines the field path fragment that connects the root record to the dependent table. The field path fragment may be the full path or a portion of the full path related to the field of the dependent record.

At 728, the process synthesizes a reverse-look-up filter bound to the root record's ID via the path fragment. Thus, the process builds a synthesized filter to identify the actual records that are dependent on the record that was changed with the calculated value.

The synthesized filter is provided to the meta-query engine 229 to determine the dependent fields at 730. The dependent record(s) returned from the meta-query engine 229 may be stored in a queue. If the meta-query returns any dependent records at 732, the process returns to step 704 (based on step 734, calculate record fields).

The dependent records are removed from the recalculation queue at 736. If no dependent records are identified by the meta-query engine 229 at 732, the calculated field is removed from the queue at 738.

FIGS. 8-29 depict examples of screens generated by the user interface 230 to enable user input of one or more table parameters, field parameters, workflow parameters, permission parameters, filters, report parameters, and other inputs. User inputs are received by the user interface 230 and used by one or more other modules/engines of the UMS 202.

Figure 8:
FIG. 8 is a screen shot of a dynamic table creation.

FIGS. 8-15 depict exemplary screens generated for enabling a user to create and manipulate dynamic components (including tables) and dynamic fields for the components for a database schema. FIG. 8 depicts an example of creating a dynamic table using the user interface. The user enters a display name, a short name, a description, a table type, and table permission parameters. The table permission parameters may include, for example, a security role for administration, policy viewers, test role, and vendor management, where the permission parameters include create, read, update, delete, and print/export for general access and create, read, update, delete, and optionally print/export for administrative access.

Figure 9:
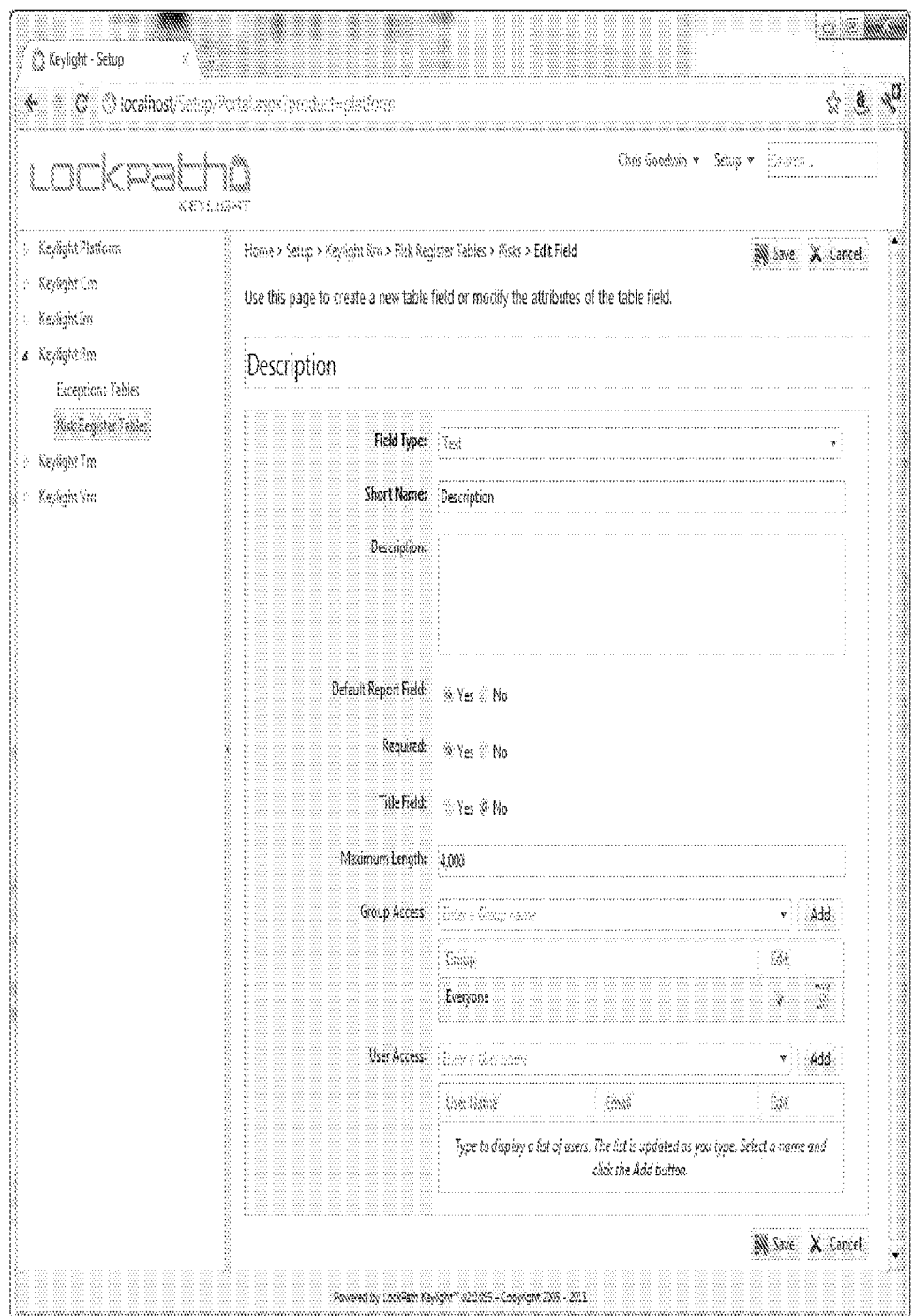
FIGS. 9-15 are examples of dynamic field creation for a dynamic table.

FIG. 9 depicts an exemplary embodiment of creating a text field for a dynamic table. The example of FIG. 9 includes a text field type with a maximum length of 4,000 characters. Though, other values may be used. The user interface screen enables the user to create a new table field or modify the attributes of an existing table field. Other attributes in the table field include a short name, a description, default report field, required, title field, group access, and user access.

Figure 10:
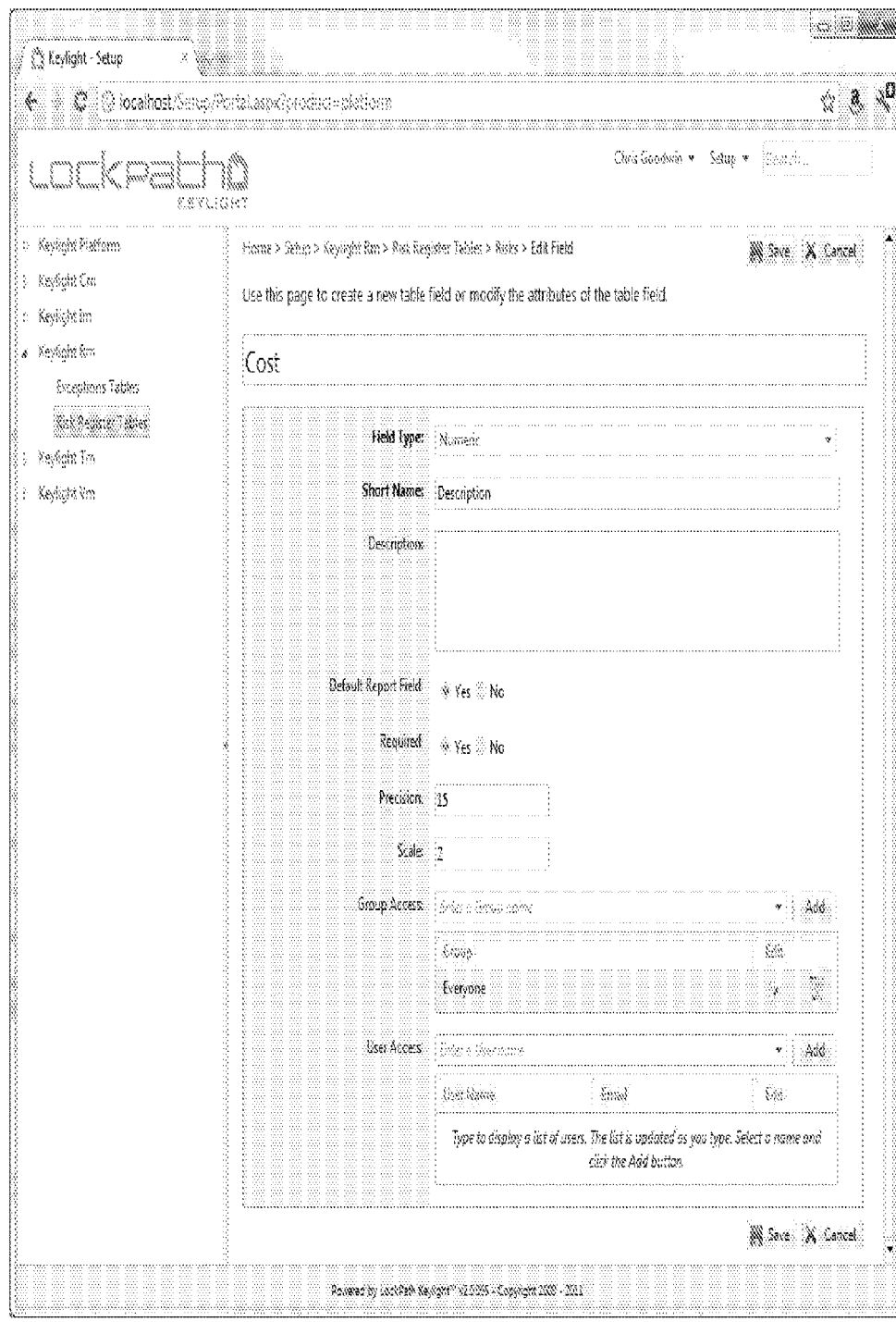

FIG. 10 depicts an exemplary embodiment of creating a numeric field for a dynamic table. In this example, a numeric field type includes an attribute for precision (the number of digits available in the numeric field) and a scale.

Figure 11:
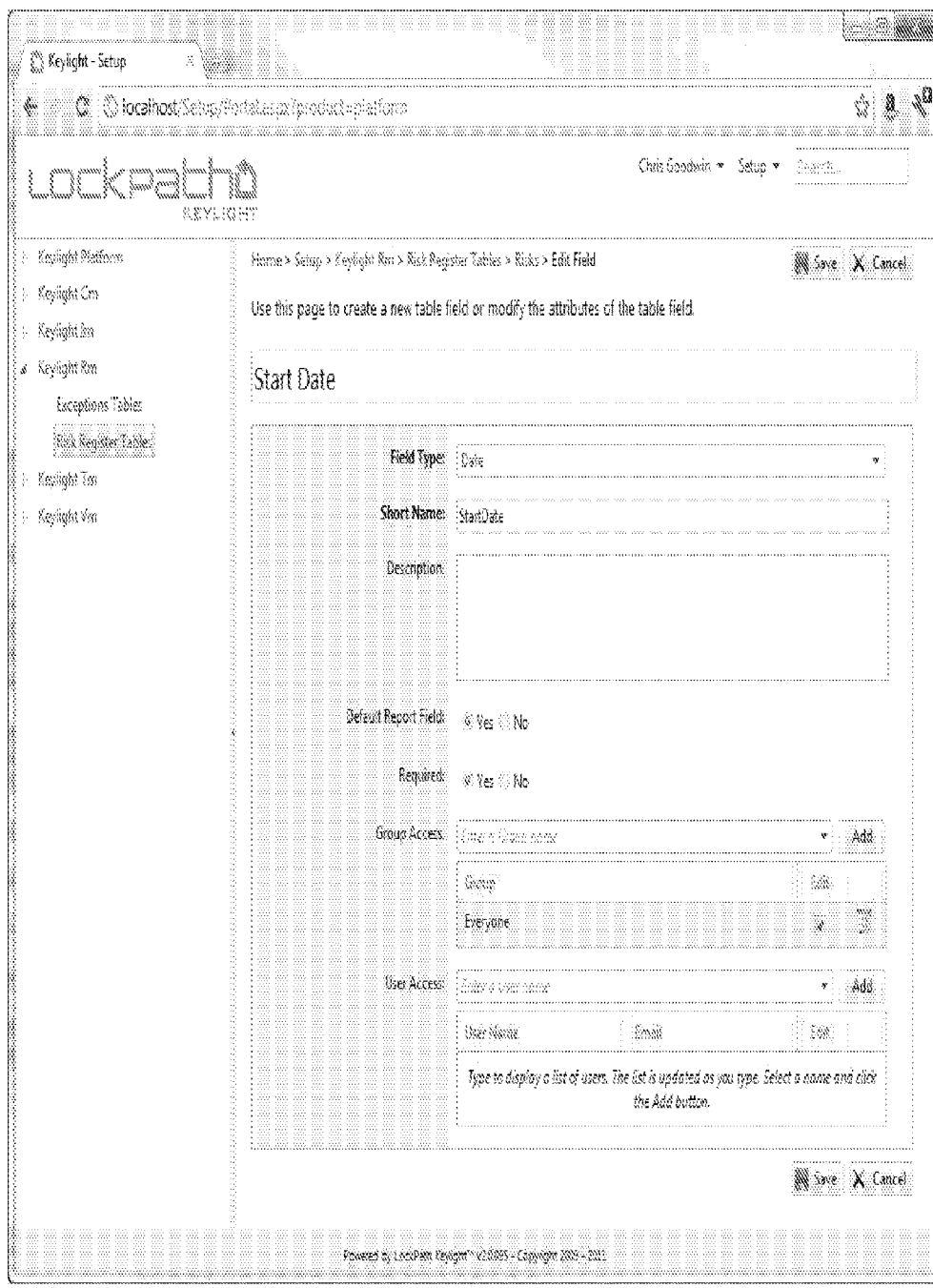

FIG. 11 depicts an exemplary embodiment of a date field for a dynamic table.

Figure 12:
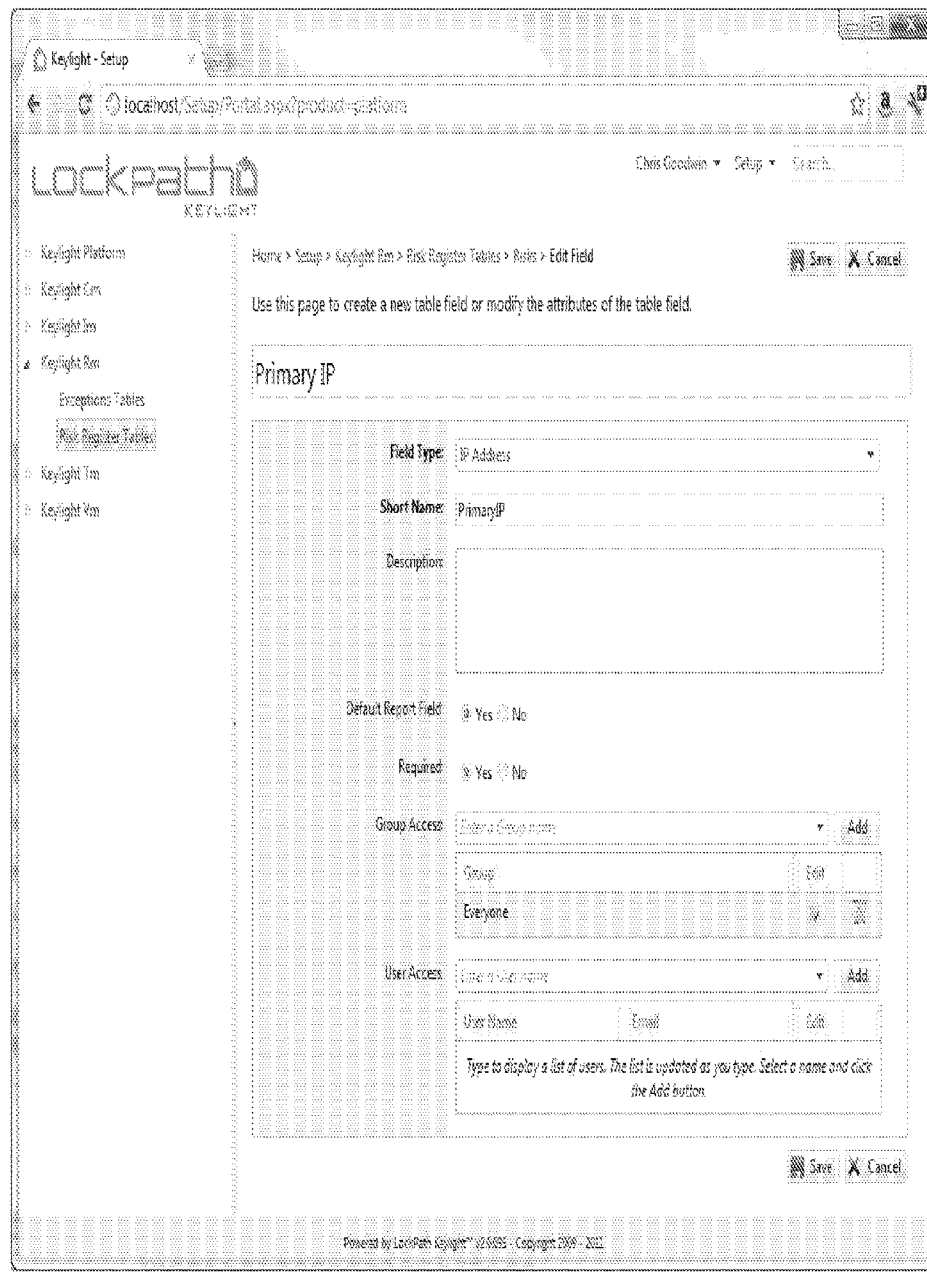

FIG. 12 depicts an exemplary embodiment of creating an internet protocol (IP) address field for a dynamic table. In this example, the display name is "Primary IP", and the short name is "PrimaryIP".

Figure 13:
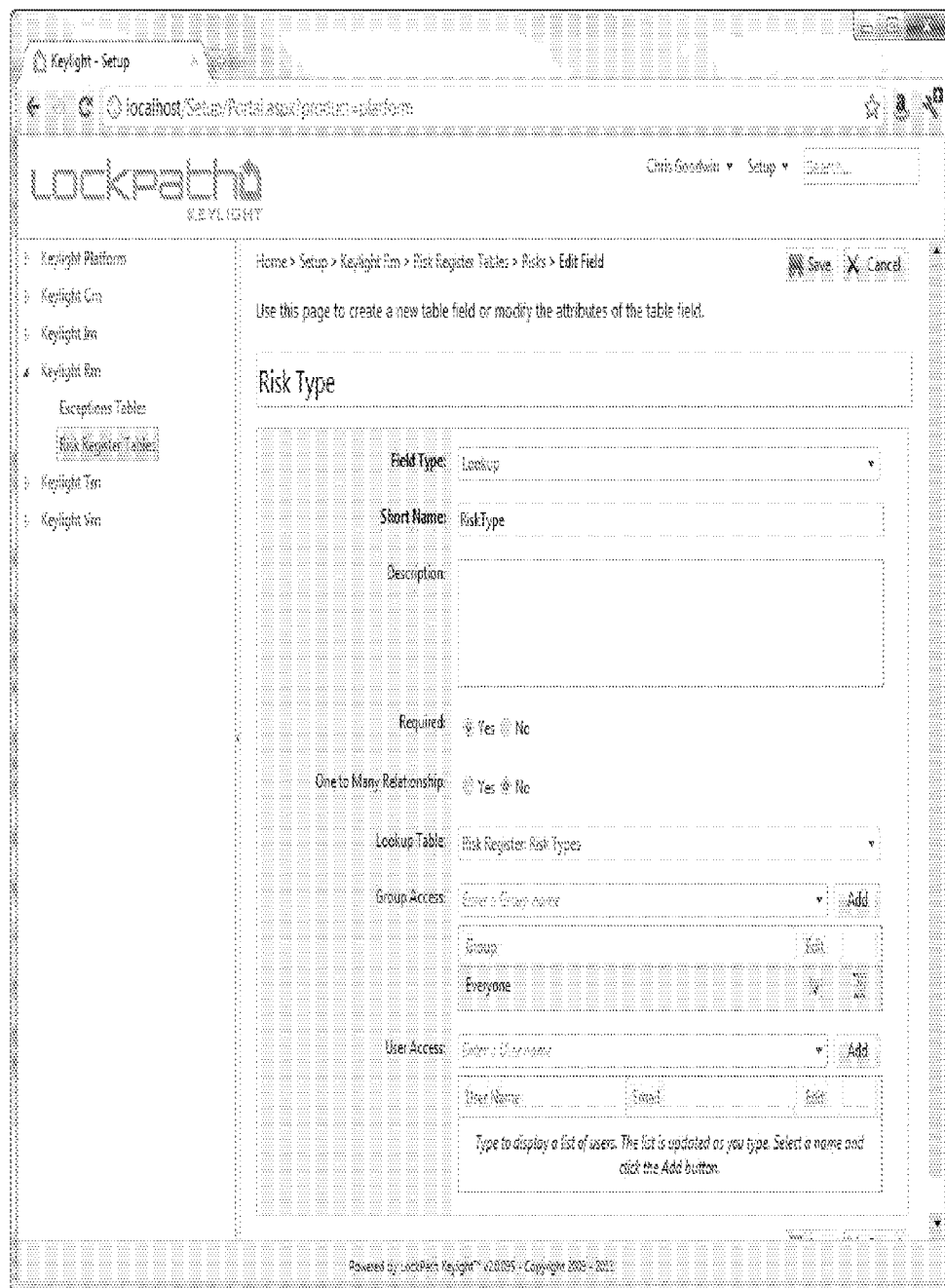

FIG. 13 depicts an exemplary embodiment of creating a look-up field for a dynamic table. In this example, the display name is "Risk Type", the short name is "RiskType", and the look-up table identifies the foreign key relationship as the "Risk Types" table, which is the table against which the foreign key is defined. The current table in which the look-up field is created is the "Risks" table. In this example, the Risks table has an ID field, and the Risk Types table has an ID field. The DCF 210 engine is configured in this example to automatically use the ID field of the source table (here the Risks table) as the primary key reference, and automatically use the ID of the target table (here the Risk Types table) as the foreign key identity.

Figure 14:
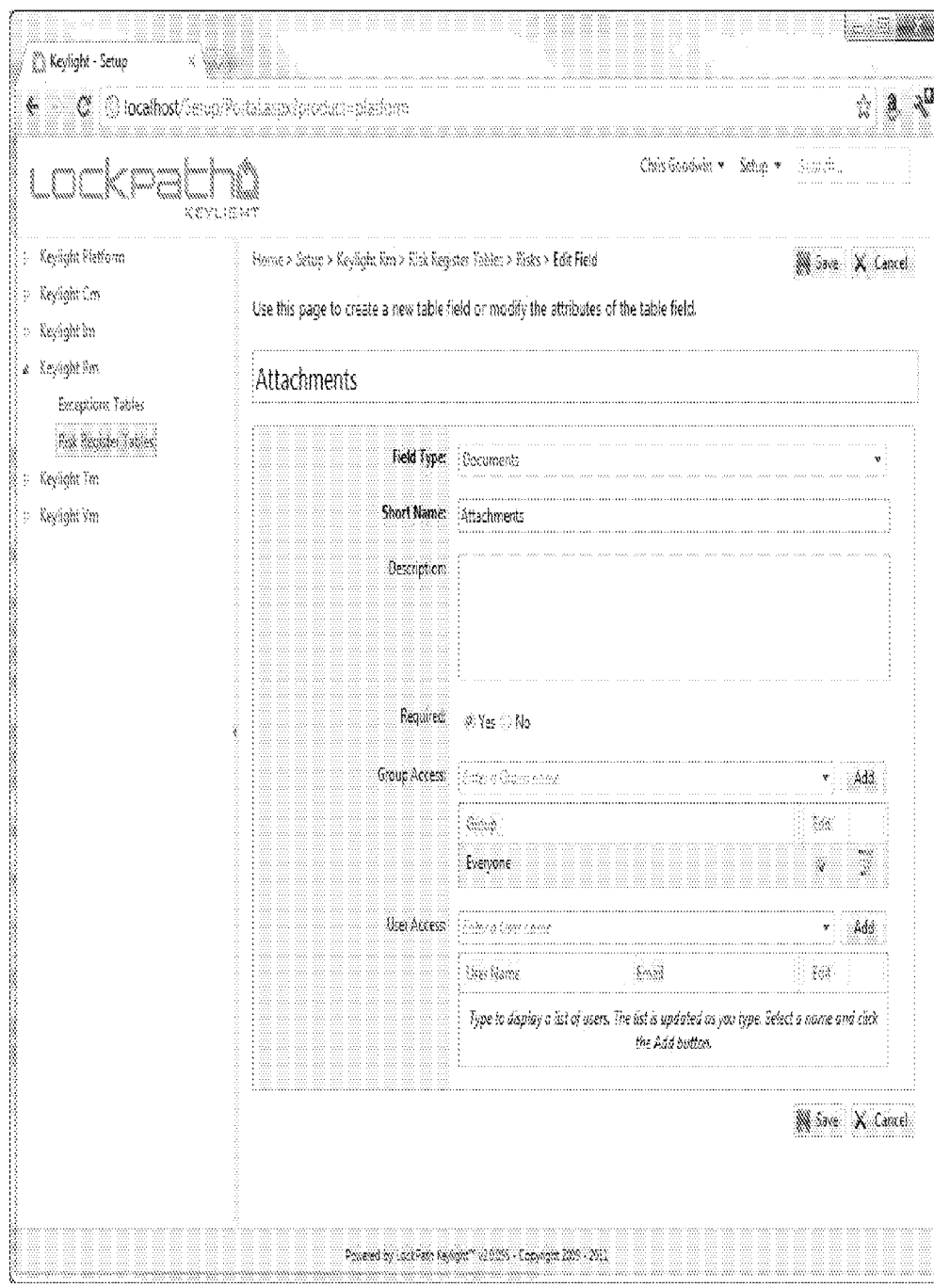

FIG. 14 depicts an exemplary embodiment of creating a document/field attachments field. The documents field type enables a document or other file to be bound to a particular record.

Figure 15:
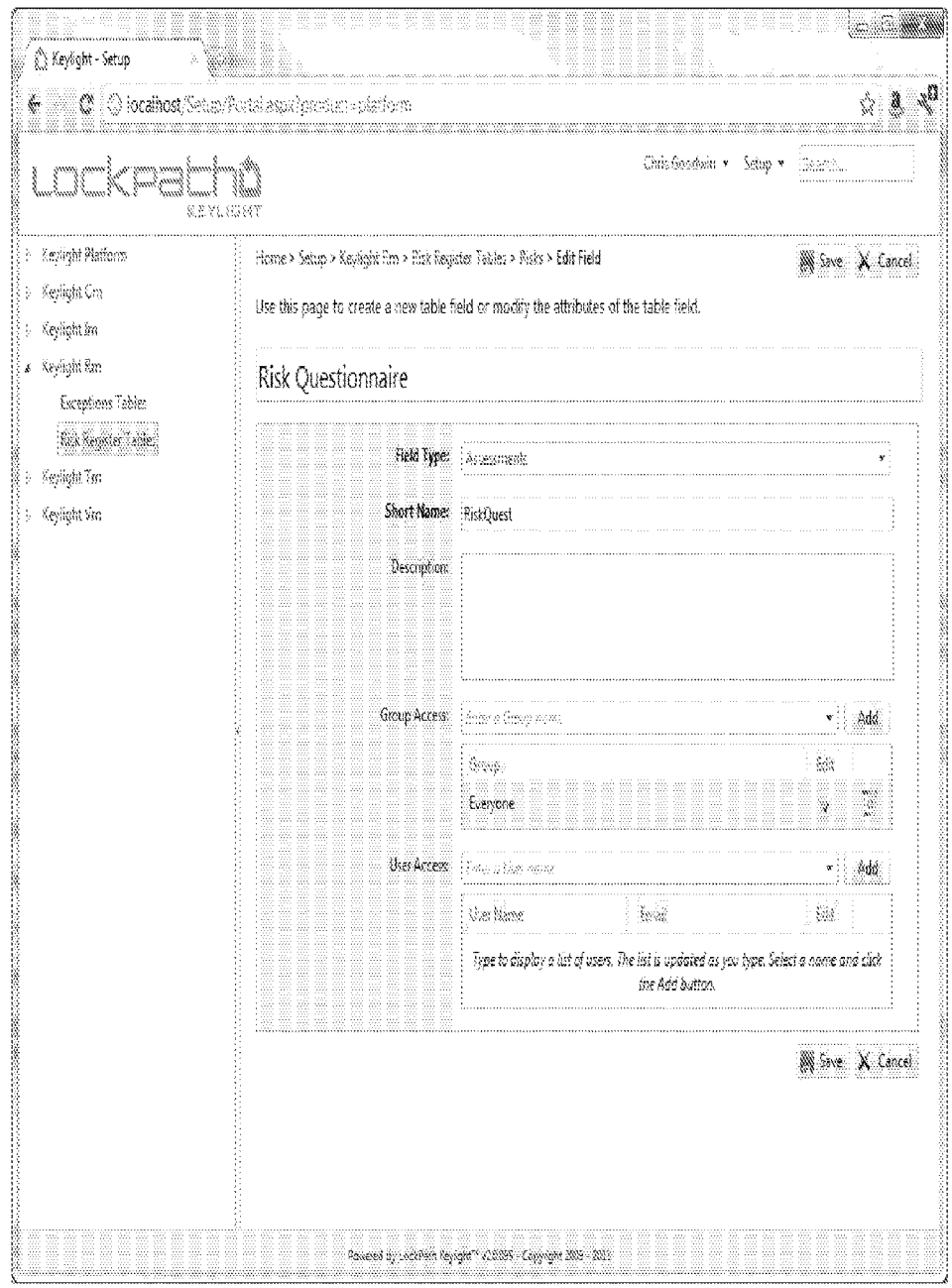

FIG. 15 depicts an exemplary embodiment of a questionnaire/assessment field. The field type of assessments enables surveys and questionnaires to be bound to particular records.

Figure 16:
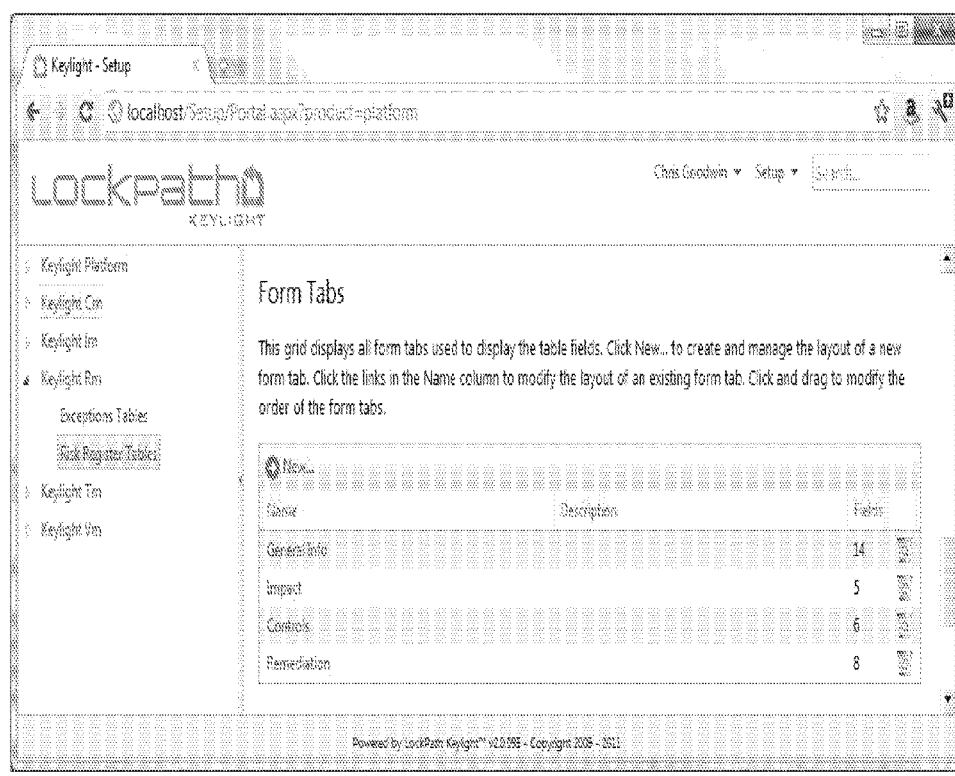
FIG. 16 is a screen shot of managing a multi-tabbed layout for a dynamic data entry form.
Figure 17:
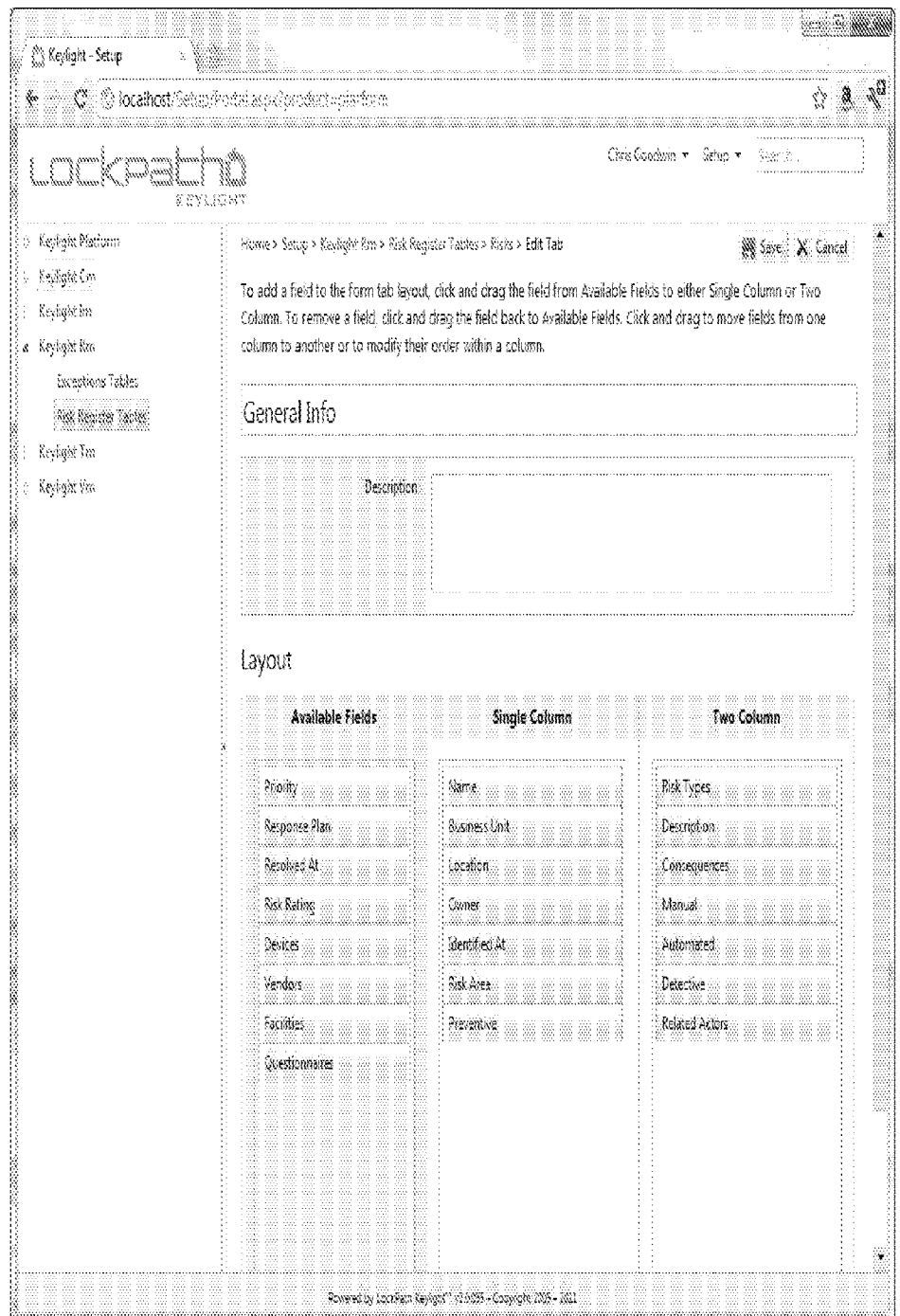
FIG. 17 is a screen shot of a drag and drop functionality for configuring a layout for a dynamic data entry form.

FIGS. 16 and 17 depict examples of user interface screens that govern the configuration of dynamic data entry forms. FIG. 16 is an exemplary embodiment of tabs used to display one or more fields of a dynamic table in a data entry form. One or more of the tabs can be added to or removed from a dynamic data entry form, and the form tabs screen enables a user to manage the layout of the dynamic data entry form.

FIG. 17 depicts an exemplary embodiment of a user interface screen that enables a user to drag and drop fields onto a data entry form or remove fields from a data entry form. The fields can be identified in a single column layout on the form or a two-column layout on the form.

Figure 18:
FIG. 18 is a screen shot of managing a dynamic table work flow.

FIGS. 18-23 depict examples of user interface screens that enable users to create and modify workflows. FIG. 18 is an exemplary embodiment of a user interface screen that enables a user to manage table workflows. The workflow grid on the screen displays all workflows (stages and transitions) for routing record content through one or more stages and transitions, including to one or more users in a non-linear process. A New button enables a user to create a new workflow process, and links in the Names column enable a user to modify existing workflow processes.

Figure 19:
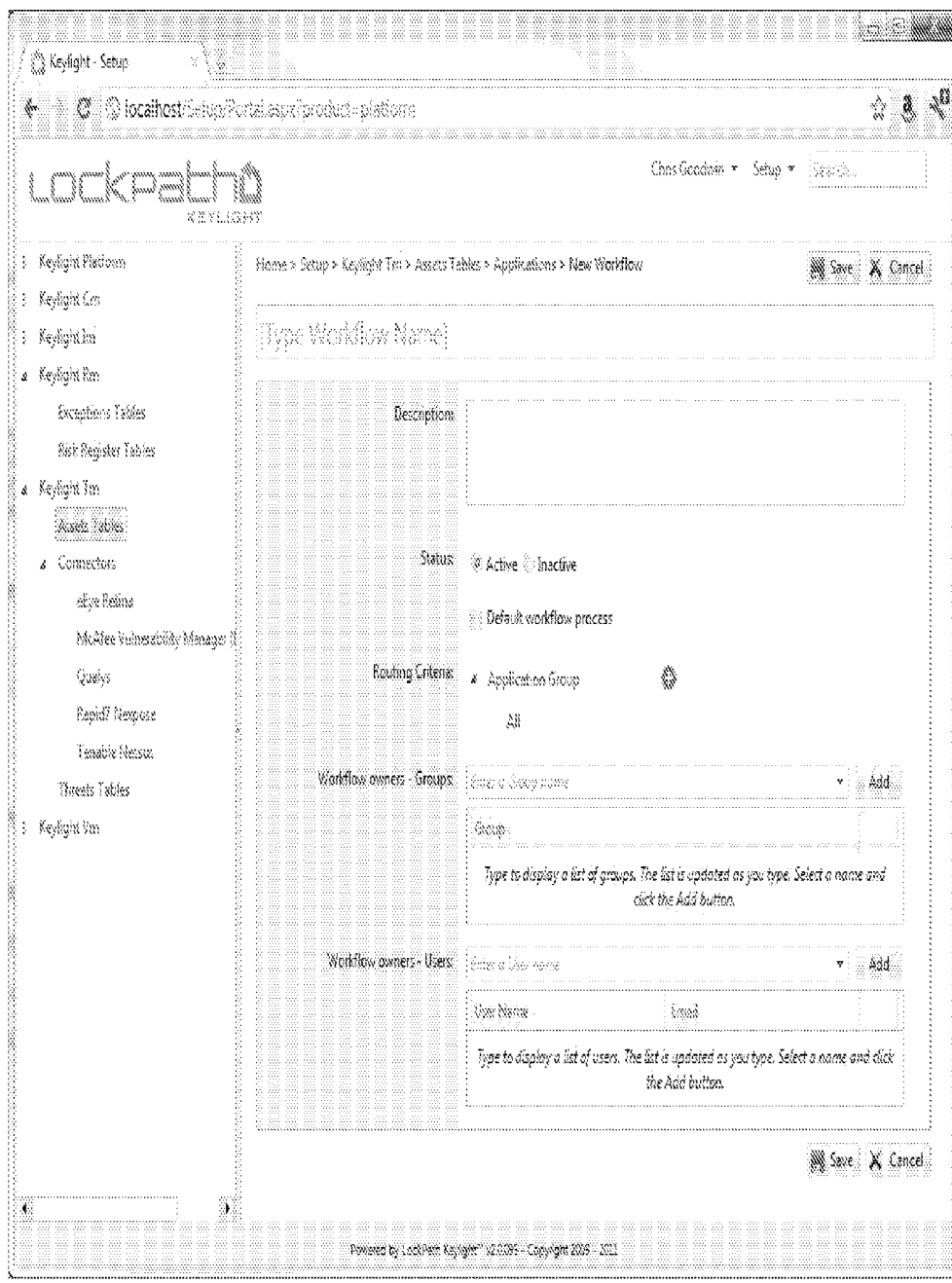
FIG. 19 is a screen shot of creating a work flow.

FIG. 19 depicts an exemplary embodiment of a screen used to create a workflow. The user enters workflow parameters, including a workflow name, a description of the workflow, an active or inactive status, whether the workflow is a default workflow process, routing criteria, groups workflow owners, and users workflow owners.

Figure 20:
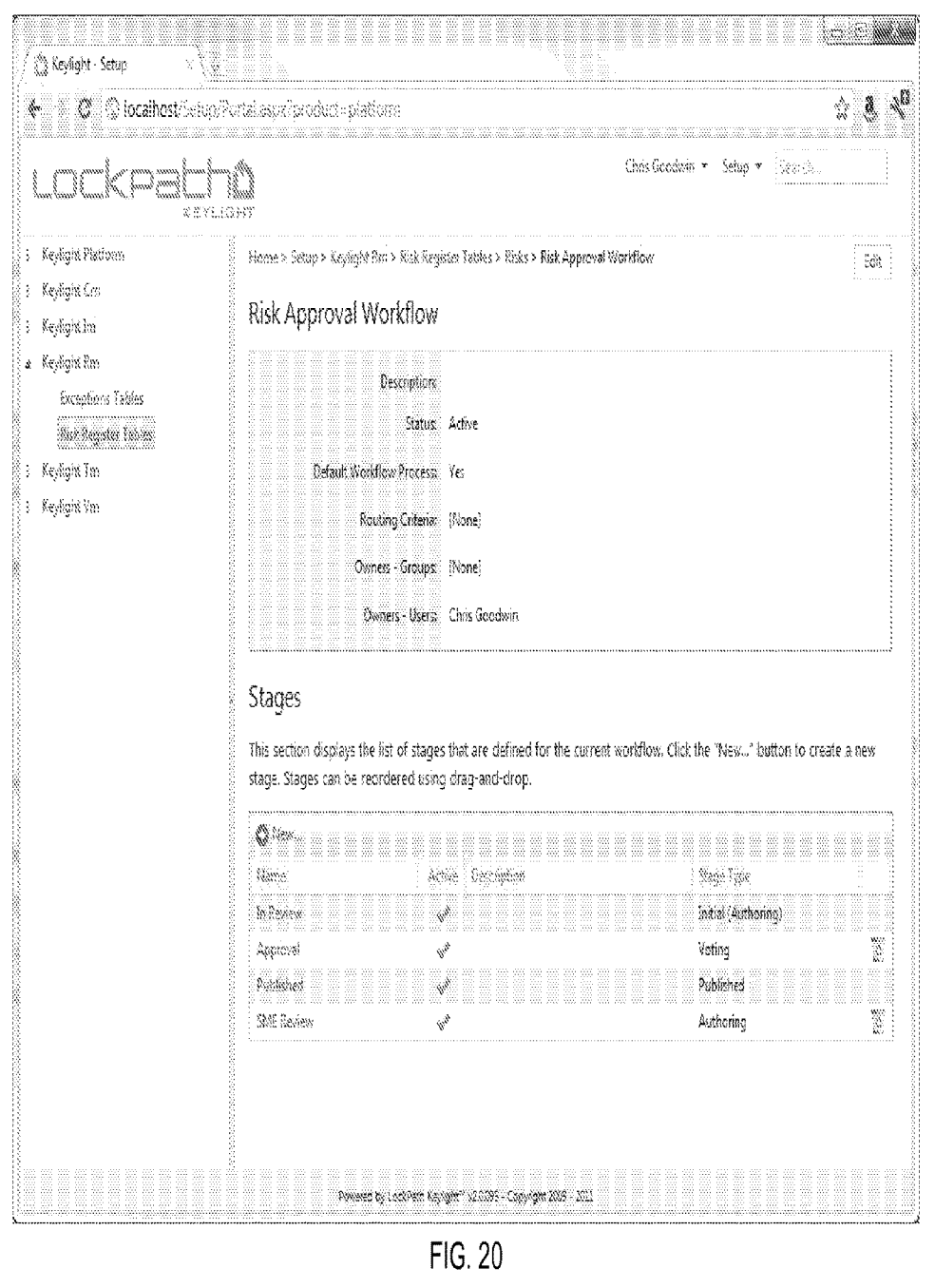

FIG. 20 depicts an exemplary embodiment of a screen for managing workflow. The example of FIG. 20 depicts managing a workflow for the "Risks" table. The managing workflow screen includes a risk approval workflow and an identification of stages. The risk approval workflow includes a description, status (active or inactive), whether the workflow is a default workflow process, a routing criteria, the groups owners for the workflow, and the users owners for the workflow. These stages include a list of stages that are defined for the current workflow. One or more stages can be added to the workflow by selecting the "New" button, and the stages can be reordered using a drag-and-drop action. For example, the workflow stages in FIG. 20 include In Review, Approval, Published, and SME review. The stage types include author, voting, published, and authoring, respectively.

Figure 21:
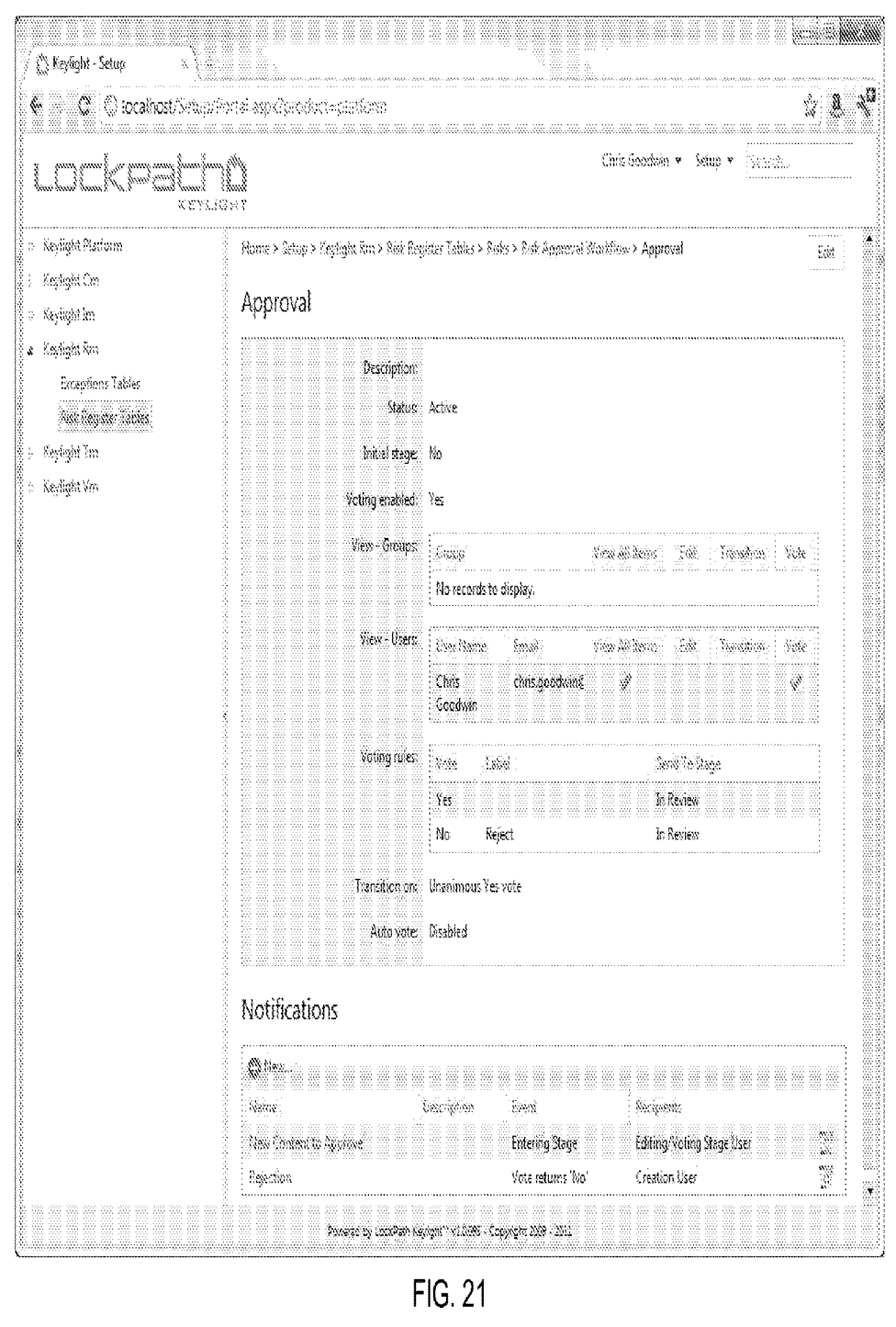

FIG. 21 depicts an exemplary embodiment of a screen for managing a workflow stage. The managing workflow stage in the example of FIG. 21 is for the "Risks" table and the "Risk Approval Workflow" workflow, and the "Approval" stage. The example of FIG. 21 includes an approval parameter entry section and a notifications section. The approval entry parameters include a description, status (active or inactive), whether the stage is an initial stage, whether the stage is voting enabled, the groups that may view the stage, the users that may view the stage, voting rules, how the stage transitions (in this case, on a unanimous yes vote) and whether the automatic voting is enabled or disabled. Notifications in this example identify the name of the notification, a description of the notification, a triggering event for the notification, and recipients of the notification.

Figure 22:
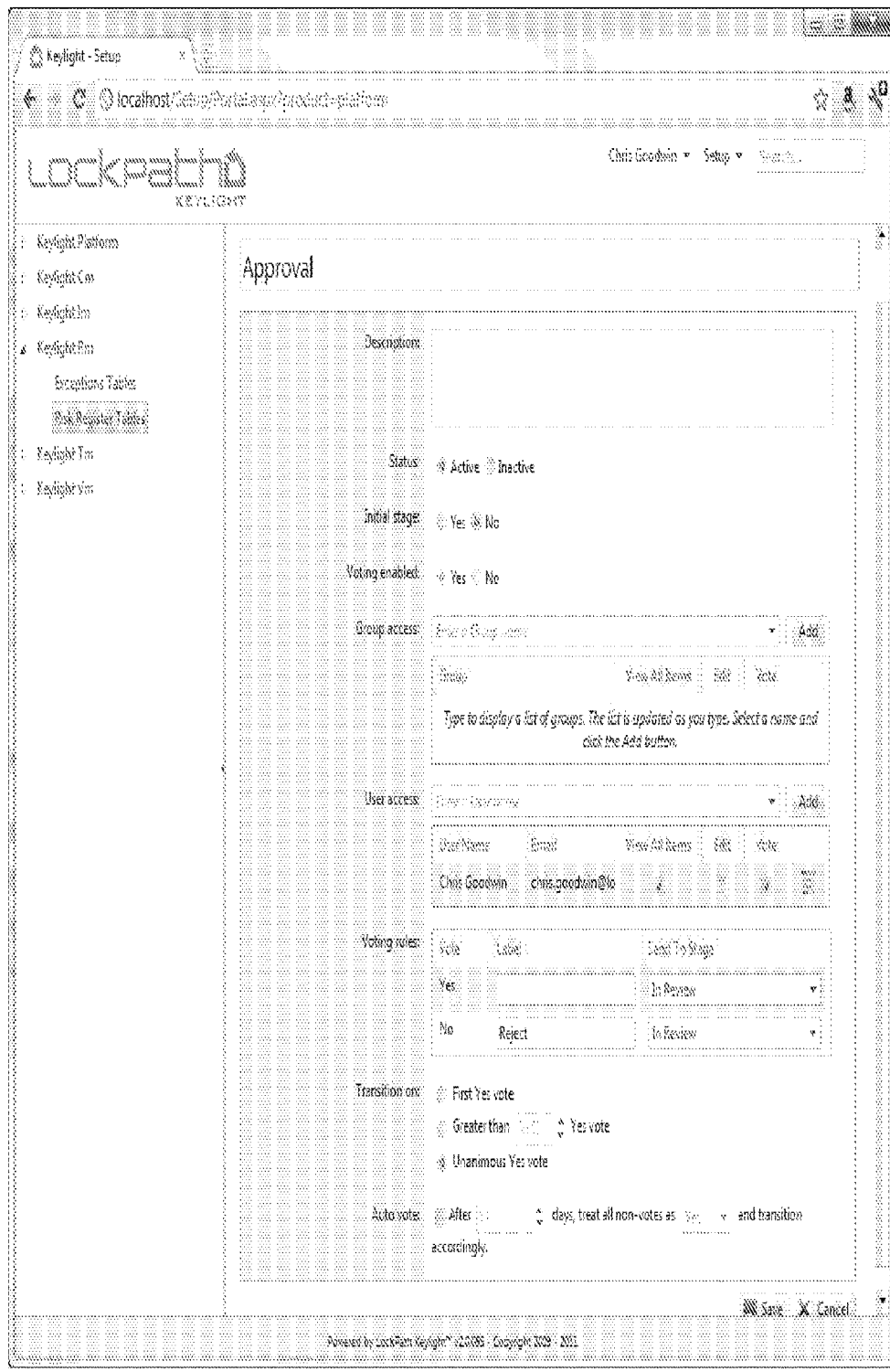
FIG. 22 is a screen shot of editing a work flow stage.

FIG. 22 depicts an exemplary embodiment of a screen for editing a workflow stage. The workflow stage being edited in the example FIG. 22 is the approval stage. The editing a workflow stage in this example includes a description, a status (active or inactive) whether or not the stage is the initial stage of the workflow, whether voting is enabled or not, group access, user access, voting rules, how the stage is transitioned (in this example, on a unanimous yes vote), and how the automatic voting is enabled (if enabled, after how many days, and how non-votes are treated in the transition).

Figure 23:
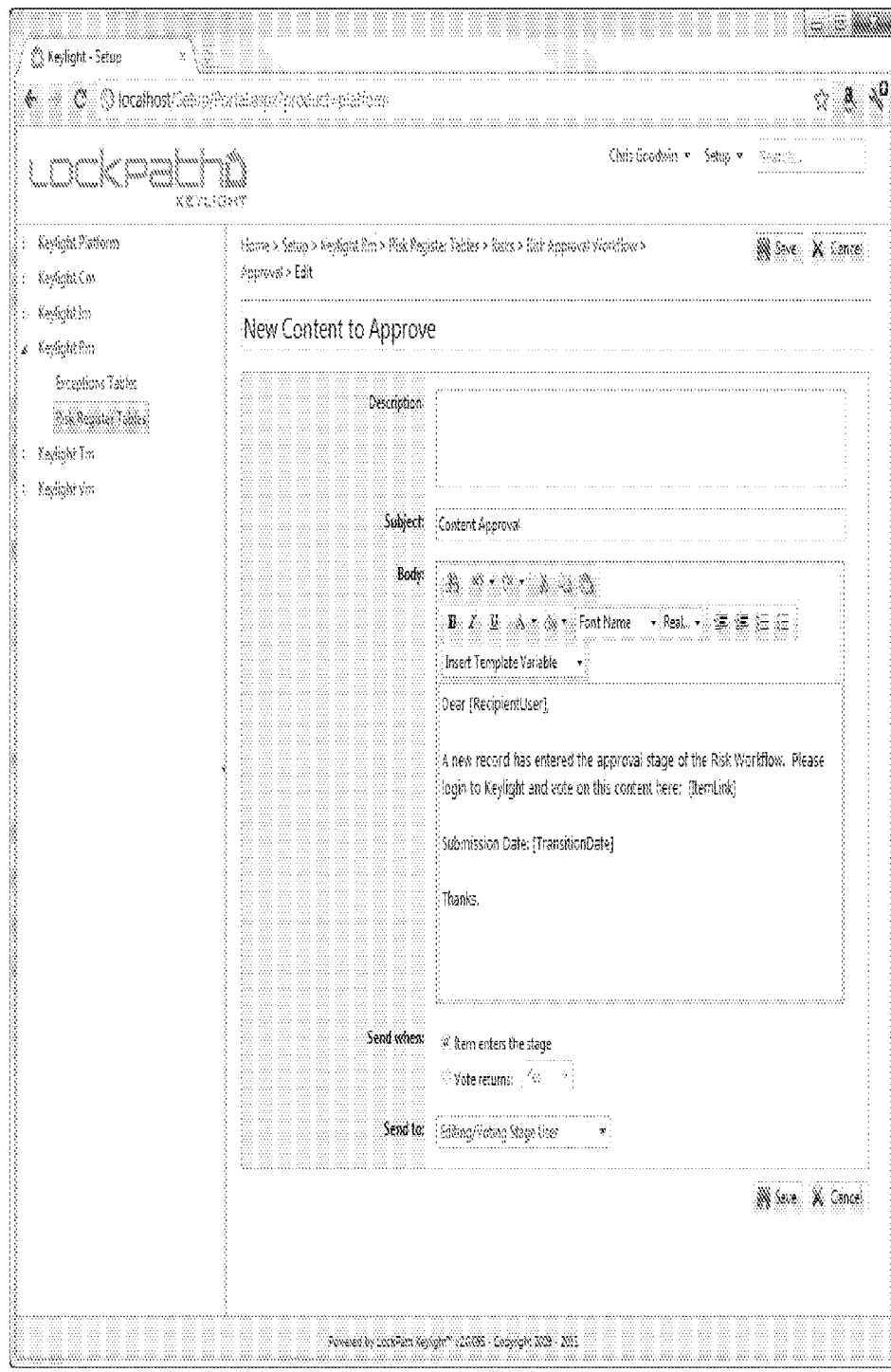
FIG. 23 is a screen shot of editing a work flow notification.

FIG. 23 depicts an exemplary embodiment of a user interface screen for editing a workflow notification. The workflow notification of FIG. 23 is entered for the "Risks" table and the "Risk Approval Workflow" workflow. In this example, the workflow notification is entitled "new content to approve" and includes a description, a subject, content to be transmitted in the notification, the trigger for the notification (in this case, send the notification when the item enters a selected stage), and to whom the notification is sent (in this case, editing/voting stage user).

Figure 24:
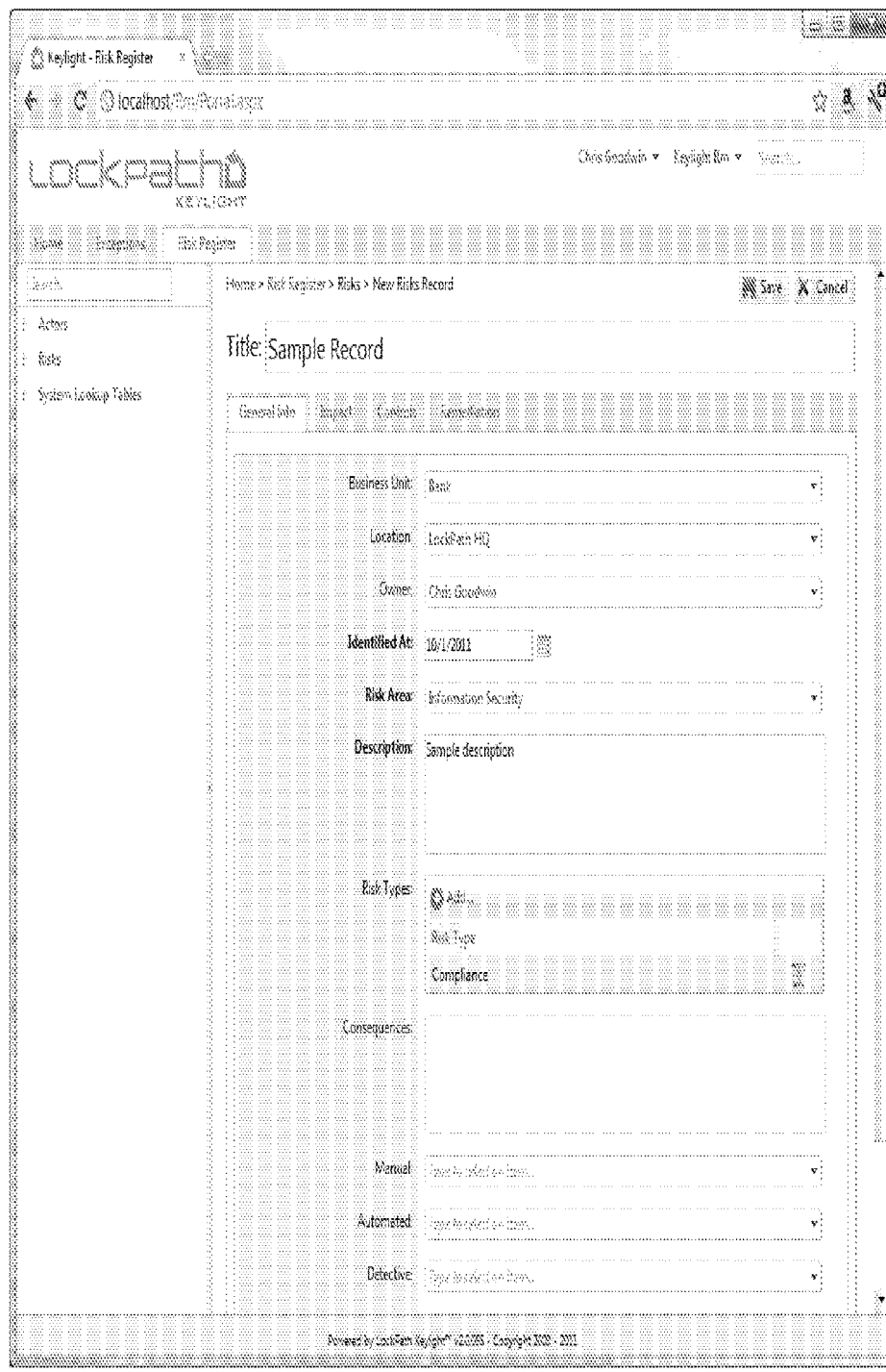
FIG. 24 is a screen shot of creating a dynamic content record.

FIGS. 24-27 depict examples of user interface screens that enable a user to create or edit content records and transition content records. FIG. 24 depicts an exemplary embodiment of creating a record, such as the UMS record identified above. The example of FIG. 24 identifies a New Risks Record to be created for the Risks table. The record creation screen enables the user to enter a title for the record and enter record parameters selected from one or more tabs, such as the general information tab, the impact tab, the controls tab, and the remediation tab. The general information tab of FIG. 24 enables the user to enter one or more record fields, such as business unit, location, owner, date, risk area, description, risk type, consequences, and other attributes. Other field attributes may be included in the impact, controls, and remediation tabs. FIG. 24 is an example of a dynamic form generated by the configuration of the form tabs of FIG. 16.

Figure 25:
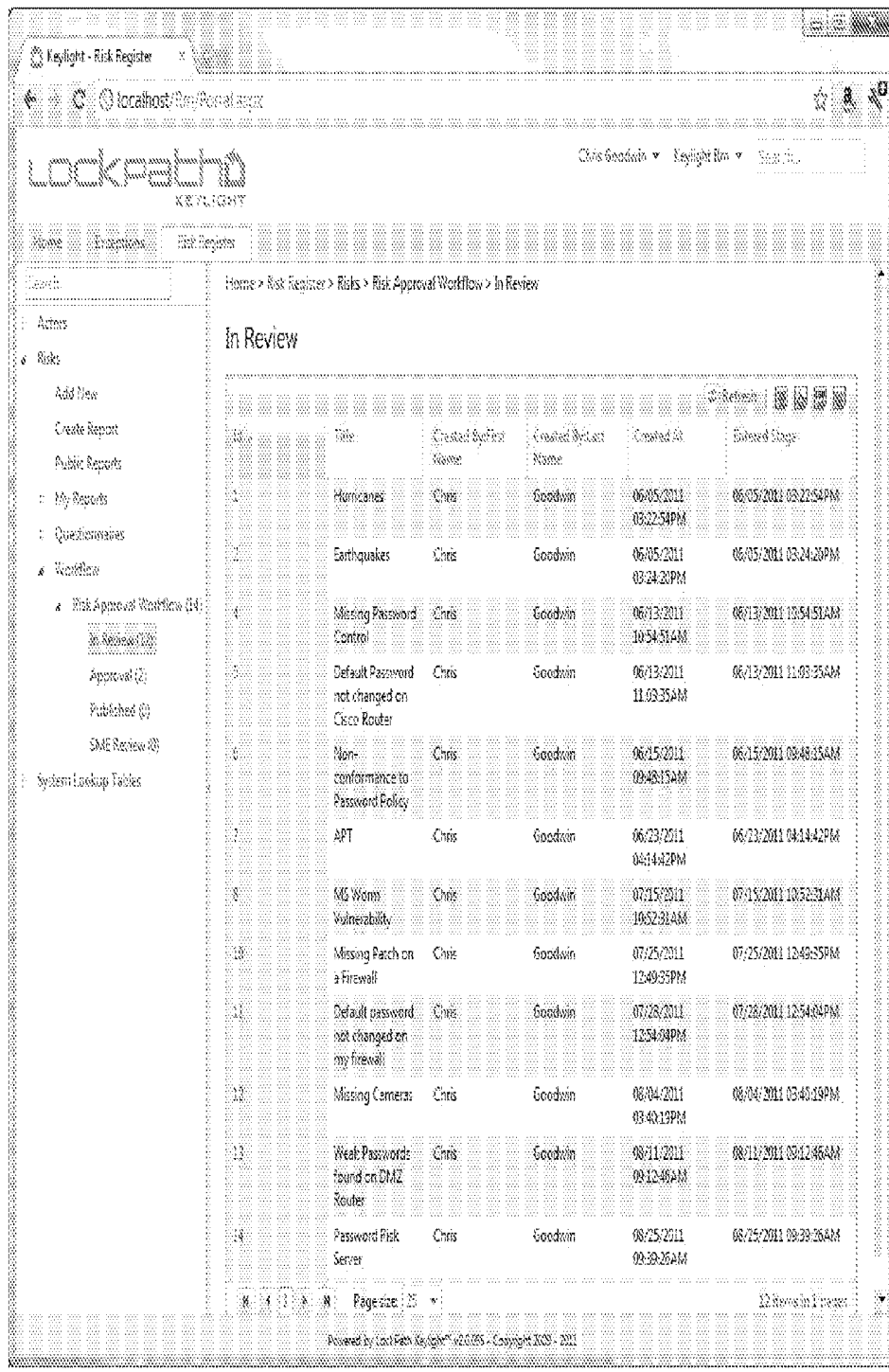
FIG. 25 is a screen shot of viewing dynamic content in a work flow stage.

FIG. 25 depicts an exemplary embodiment of a screen for viewing content in a workflow stage. The example of FIG. 25 includes content in the "In Review" stage of the "Risk Approval Workflow" workflow for the "Risks" table. The identified contents include a title and one or more fingerprint fields, including the created by and created at/when fields. The viewing content stage screen also includes the date and time stamp at which the stage was entered.

Figure 26:
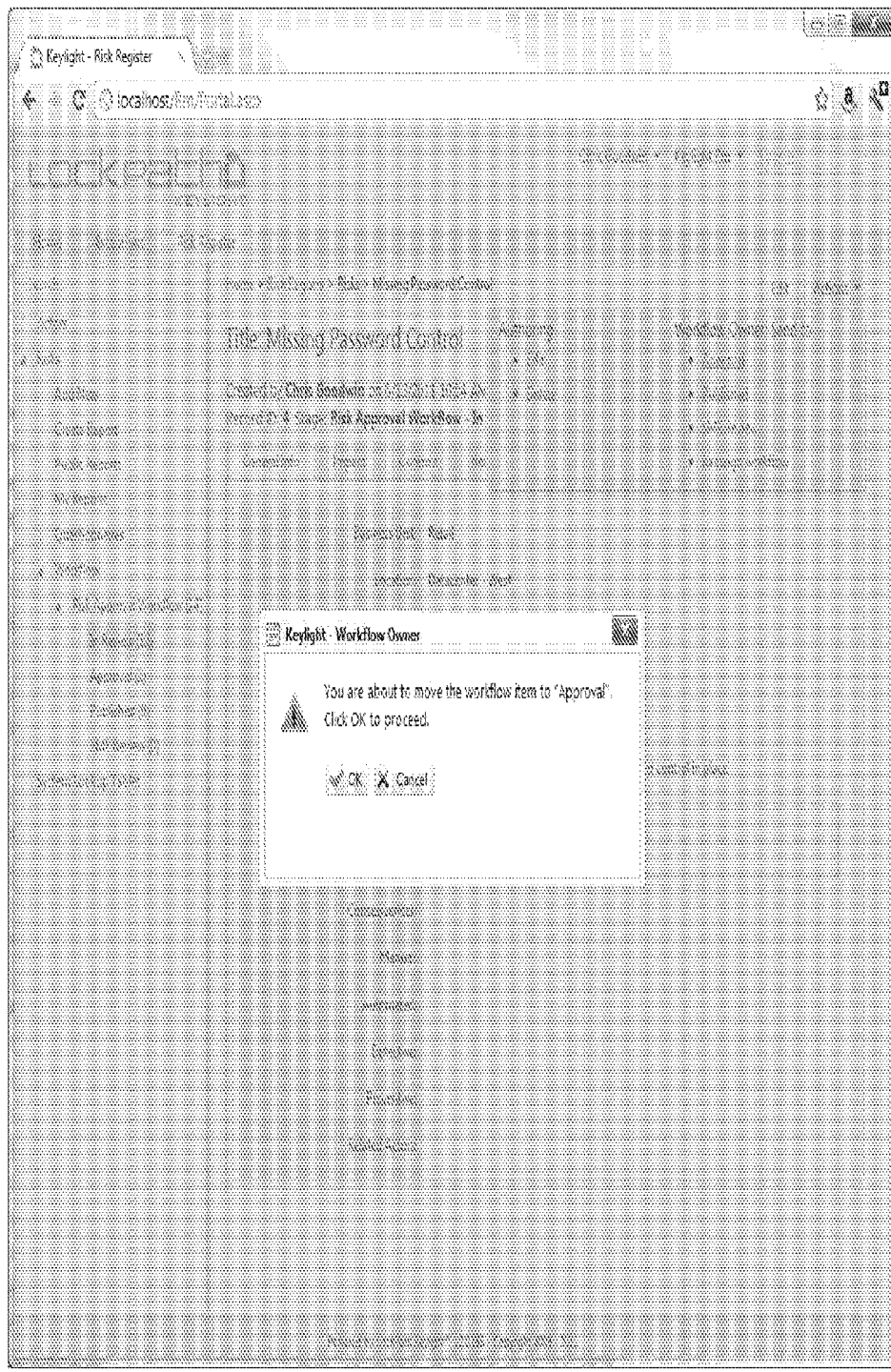
FIG. 26 is a screen shot of transitioning dynamic content for a work flow.

FIG. 26 is an exemplary embodiment of a screen generated for transitioning content. A transitioning content notification box may be generated when a workflow item is transitioned from one stage to another, such as when a user approves a workflow item.

Figure 27:
FIG. 27 is a screen shot of adding fields to a report to create a report.
Figure 28:
FIG. 28 is a screen shot of adding filters to a report to create a report.
Figure 29:
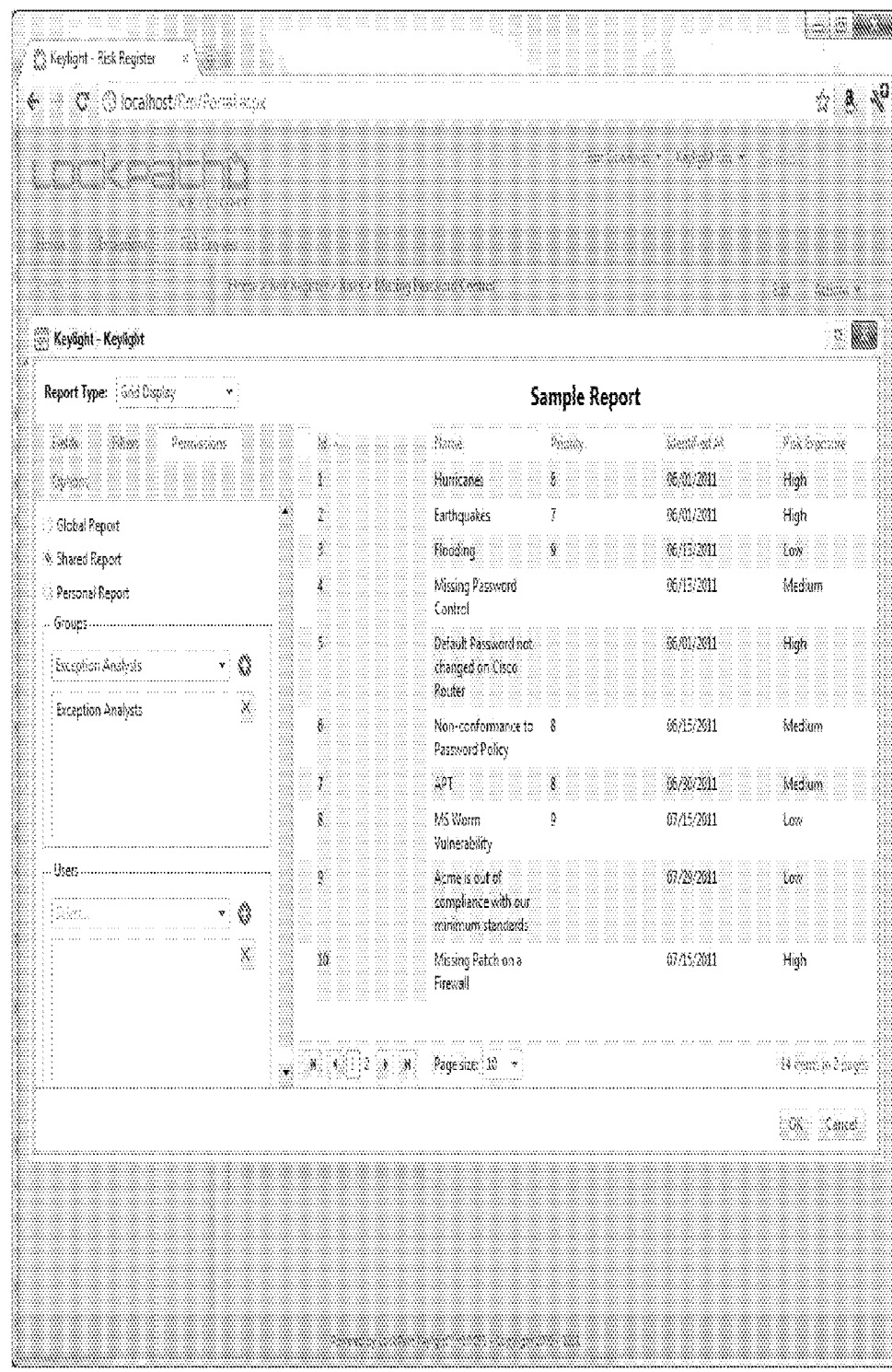
FIG. 29 is a screen shot of adding permissions to a report to create a report.

FIGS. 27-29 depict examples of user interface screens that enable users to create and edit reports in real time via a real time ad hoc report builder.

FIG. 27 depicts an exemplary embodiment of a report designer screen used for adding fields from records to a report. FIG. 28 depicts an exemplary embodiment of adding filters that are applied to generate the report. FIG. 29 depicts an exemplary embodiment of adding permissions that are used to generate the report.

Combinations and sub-combinations of and permutations to the above systems and components described herein may be made.

Those skilled in the art will appreciate that variations from the specific embodiments disclosed above are contemplated by the invention. The invention should not be restricted to the above embodiments, but should be measured by the following claims.

What is claimed is:

1. A dynamic content system comprising:
a processor; and
a dynamic meta-assembly engine that executes on the processor to, at run-time, create a database markup language file representation of a dynamic relational database table, modify the database markup language file representation based on metadata describing the physical structures of the dynamic table, create object model source code classes from the modified database markup language file representation, and compile the classes.

2. The system of claim 1 wherein the dynamic meta-assembly engine, at run-time prior to compiling the classes, modifies the classes to include at least one of at least one property of a base class and at least one method of the base class.

3. The system of claim 2 wherein the metadata comprises table metadata and field metadata and the at least one property comprises at least one accessor to accept an identity of a metadata field describing a dynamic table field to access data from at least one class at run-time.

4. The system of claim 1 wherein the metadata comprises table metadata and field metadata and the dynamic meta-assembly engine stores the compiled classes in memory, crawls the compiled classes via reflection, maps the crawled classes with the table metadata, the field metadata, relational bindings, and inter-relational bindings, and stores the mapped classes in a reflection cache in memory.

5. The system of claim 4 wherein the metadata and reflection cache comprise a meta-assembly bundle.

6. The system of claim 5 wherein:
a dynamic content framework engine triggers regeneration of the meta-assembly bundle by transmitting a trigger to the dynamic meta-assembly engine; and
the dynamic meta-assembly engine receives the trigger and, in response creates an update to the database markup language file representation of the dynamic relational database table, modifies the database markup language file representation based on the metadata describing the physical structures of the dynamic table, creates object model source code classes from the modified database markup language file representation, compiles the classes, stores the compiled classes in memory, crawls the compiled classes via reflection, maps the classes and their properties with the table metadata and field metadata, relational bindings, and inter-relational bindings, and stores the mappings in the reflection cache.

7. The system of claim 1 wherein:
the dynamic meta-assembly engine stores the compiled classes in memory; and
the system further comprises a meta query engine to execute the compiled classes to at least one of get data from the relational database and store data to the relational database.

8. The system of claim 1 further comprising a dynamic content framework engine that receives one or more other parameters of another physical table structure of a static relational database table and one or more other physical field structures of the other physical table structure, the physical structures defining static content, and create other metadata describing the physical structures of the static table.

9. The system of claim 8 wherein:
the dynamic meta-assembly engine stores the compiled classes in memory; and
the system further comprises a meta query engine to execute the compiled classes to at least one of get data from the relational database and store data to the relational database.

10. The system of claim 9 further comprising a dynamic meta-reporting engine to select at least one of dynamic content and static content based on one or more reporting parameters and reports the selected content.

11. The system of claim 10 further wherein the dynamic meta-reporting engine enables relational filtering to select the at least one of the dynamic content and the static content.

12. The system of claim 10 wherein selecting the at least one of the dynamic content and the static content comprises using at least one filter comprising at least one field path of at least one table field by iteratively walking the field path and dynamically constructing a query expression tree that maps each node of the field path via reflective instantiation and using the query expression tree to select the dynamic content and the static content from objects representing the relational database.

13. The system of claim 12 wherein:
the dynamic meta-reporting engine logically fuses implicit relationships of a plurality of filters with at least one logical expression to create a logically fused expression; and
the system further comprises a meta query engine to execute the compiled classes with the logically fused expression to at obtain data from the relational database.

14. The system of claim 1 wherein the dynamic content engine determines when the at least one parameter identifies a many to many relational field and, when the many to many relational field, creates an intermediary table to contain source field an target field identifier pair representing primary key-foreign key identities for the field and stores intermediary table metadata describing the intermediary table.

15. The system of claim 1 further comprising a formula engine to;
detect at least one field in the dynamic table requiring calculation by detecting a change in metadata associated with at least one record on which the at least one field relies;
calculate a value of the field; and
populate the value in the at least one record associated with the field.

16. The system of claim 15 wherein the formula engine detects the at least one field by:
determining a formula for the field that is dependent on a current calculation;
determining a field path fragment that connects a root record to the dependent field;
synthesizing a reverse-look-up filter bound to an identification of the root record via the path fragment to build a synthesized filter to identify a dependent record that is dependent on the record that was changed; and
using the synthesized filter to determine the dependent field.

17. The system of claim 1 further comprising a workflow engine to create a nonlinear workflow for content to include one or more stages that each define a point at which an applied workflow occurs with one or more transitions each defining how or when the content gets from one stage or action to a next stage or action.

18. The system of claim 17 wherein the workflow engine processes a workflow trigger to determine when a content item enters a stage or action or leaves the stage or action and to define the next stage or next action.

19. The system of claim 1 wherein the metadata comprises table metadata describing at least one table physical structure and field metadata describing at least one field physical structure.

20. The system of claim 19 wherein the at least one table physical structure is defined in at least one user entered table definition and the at least one field physical structure is defined in at least one user entered field definition.

21. The system of claim 1 wherein the database markup language file representation comprises an extensible markup language file representation.

22. A dynamic content method comprising:
creating, at least one processor at run-time, a database markup language file representation of a dynamic relational database table;
modifying the database markup language file representation based on metadata describing the physical structures of the dynamic table;
creating object model source code classes from the modified database markup language file representation; and
compiling the classes.

23. The method of claim 22 further comprising, at run-time prior to compiling the classes, modifying the classes to include at least one of at least one property of a base class and at least one method of the base class.

24. The method of claim 23 wherein the metadata comprises table metadata and field metadata and the method further comprises modifying the classes to include the at least one property comprising at least one accessor to accept an identity of a metadata field describing a dynamic table field to access data from at least one class at run-time.

25. The method of claim 22 wherein the metadata comprises table metadata and field metadata and the method further comprises:
storing the compiled classes in memory;
crawling the compiled classes via reflection;
mapping the crawled classes with the table metadata, the field metadata, relational bindings, and inter-relational bindings; and
storing the mapped classes in a reflection cache in memory.

26. The method of claim 25 wherein the metadata and reflection cache comprise a meta-assembly bundle.

27. The method of claim 26 further comprising triggering regeneration of the meta-assembly bundle by:
creating an update to the database markup language file representation of the dynamic relational database table;
modifying the database markup language file representation based on the metadata describing the physical structures of the dynamic table;
creating object model source code classes from the modified database markup language file representation, compiles the classes;
storing the compiled classes in memory;
crawling the compiled classes via reflection, maps the classes and their properties with the table metadata and field metadata, relational bindings, and inter-relational bindings; and
storing the mappings in the reflection cache.

28. The method of claim 22 further comprising:
storing the compiled classes in memory; and
executing the compiled classes to at least one of get data from the relational database and store data to the relational database.

29. The method of claim 22 further comprising receiving one or more other parameters of another physical table structure of a static relational database table and one or more other physical field structures of the other physical table structure, the physical structures defining static content, and creating other metadata describing the physical structures of the static table.

30. The method of claim 29 further comprising:
storing the compiled classes in memory; and
executing the compiled classes to at least one of get data from the relational database and store data to the relational database.

31. The method of claim 30 further comprising selecting at least one of dynamic content and static content based on one or more reporting parameters and reporting the selected content.

32. The method of claim 31 wherein the one or more reporting parameters comprise at least one of an access permission parameter and a workflow parameter.

33. The method of claim 31 further comprising enabling relational filtering to select the at least one of the dynamic content and the static content.

34. The method of claim 31 wherein selecting the at least one of the dynamic content and the static content comprises using at least one filter comprising at least one field path of at least one table field by iteratively walking the field path and dynamically constructing a query expression tree that maps each node of the field path via reflective instantiation and using the query expression tree to select the dynamic content and the static content from objects representing the relational database.

35. The method of claim 34 further comprising:
logically fusing implicit relationships of a plurality of filters with at least one logical expression to create a logically fused expression; and
executing the compiled classes with the logically fused expression to at obtain data from the relational database.

36. The method of claim 22 further comprising determining when the at least one parameter identifies a many to many relational field and, when the many to many relational field creating an intermediary table to contain source field an target field identifier pairs representing primary key-foreign key identities for the field and storing intermediary table metadata describing the intermediary table.

37. The method of claim 22 further comprising:
detecting at least one field in the dynamic table requiring calculation by detecting a change in metadata associated with at least one record on which the at least one field relies;
calculating a value of the field; and
populating the value in the at least one record associated with the field.

38. The method of claim 37 further comprising detecting the at least one field by:
determining a formula for the field that is dependent on a current calculation;
determining a field path fragment that connects a root record to the dependent field;
synthesizing a reverse-look-up filter bound to an identification of the root record via the path fragment to build a synthesized filter to identify a dependent record that is dependent on the record that was changed; and
using the synthesized filter to determine the dependent field.

39. The method of claim 22 further comprising creating a non-linear workflow for content to include one or more stages that each define a point at which an applied workflow occurs with one or more transitions each defining how or when the content gets from one stage or action to a next stage or action.

40. The method of claim 39 further comprising transmitting a notification for a stage.

41. The method of claim 39 further comprising processing a workflow trigger to determine when a content item enters a stage or action or leaves the stage or action and to define the next stage or next action.

42. The method of claim 22 wherein compiling the classes comprises compiling the classes into a runtime data link library.

43. The method of claim 22 wherein the metadata comprises table metadata describing at least one table physical structure and field metadata describing at least one field physical structure.

44. The method of claim 43 wherein the at least one table physical structure is definer in at least one user entered table definition and the at least one field physical structure is defined in at least one user entered field definition.

45. The method of claim 44 wherein the at least one field physical structure comprises at least one of a one-to-one relational field and a one-to many relational field.

46. The method of claim 22 wherein the database markup language file representation comprises an extensible markup language file representation.

47. A computer readable storage medium comprising instructions executable by a processor to:
create, at run-time, a database markup language file representation of a dynamic relational database table;
modify the database markup language file representation based on metadata describing the physical structures of the dynamic table;
create object model source code classes from the modified database markup language file representation; and
compile the classes.

48. A computer-readable medium having contents adapted to cause a computer system to perform a method to integrate dynamic and static content, the method comprising:
receiving parameters of a physical table structure for a table and one or more physical field structures for the table, the physical structures defining the dynamic content;
creating metadata describing the physical structures;
detecting at least one field in the table requiring calculation;
calculating the detected field;
dynamically generating code for the dynamic content;
selecting dynamic content; and
reporting selected content based on one or more reporting parameters.

49. A method to integrate dynamic and static content, comprising:
receiving parameters of a physical table structure for a table and one or more physical field structures for the table, the physical structures defining the dynamic content;
creating metadata describing the physical structures;
detecting at least one field in the table requiring calculation;

calculating the detected field;
with a processor, dynamically generating code for the dynamic content;
selecting dynamic content; and
reporting selected content based on one or more reporting parameters.

* * * * *

UNITED STATES PATENT AND TRADEMARK OFFICE
CERTIFICATE OF CORRECTION

PATENT NO.       : 9,594,778 B1
APPLICATION NO.  : 14/470821
DATED            : March 14, 2017
INVENTOR(S)      : Goodwin et al.

Page 1 of 1

It is certified that error appears in the above-identified patent and that said Letters Patent is hereby corrected as shown below:

In the Specification

In Column 5, Line 34, delete "DUNK" and insert -- DLINK --, therefor.

In the Claims

In Column 30, Line 25, in Claim 44, delete "definer" and insert -- defined --, therefor.

Signed and Sealed this
Thirtieth Day of May, 2017

Michelle K. Lee
*Director of the United States Patent and Trademark Office*